United States Patent [19]

Kato

[11] Patent Number: 5,006,441
[45] Date of Patent: Apr. 9, 1991

[54] LIQUID DEVELOPER FOR ELECTROSTATIC PHOTOGRAPHY

[75] Inventor: Eiichi Kato, Shizuoka, Japan

[73] Assignee: Fuji Photo Film Co., Ltd., Kanagawa, Japan

[21] Appl. No.: 457,914

[22] Filed: Dec. 27, 1989

[30] Foreign Application Priority Data

Dec. 27, 1988 [JP] Japan .................................. 63-328013
Jan. 13, 1989 [JP] Japan ...................................... 1-4618
Jan. 13, 1989 [JP] Japan ...................................... 1-4619

[51] Int. Cl.$^5$ .............................................. G03G 9/12
[52] U.S. Cl. ...................................... 430/114; 430/904
[58] Field of Search ................................ 430/114, 904

[56] References Cited

U.S. PATENT DOCUMENTS 4,618,557  10/1986  Dan et al. ............................ 430/114
4,665,002   5/1987  Dan et al. ............................ 430/114
4,837,102   6/1989  Dan et al. ............................ 430/114

FOREIGN PATENT DOCUMENTS 60-185903  9/1985  Japan .
60-185962  9/1985  Japan .
62-166362  7/1987  Japan .

Primary Examiner—David Welsh
Attorney, Agent, or Firm—Sughrue, Mion, Zinn, Macpeak & Seas

[57] ABSTRACT

A liquid developer for electrostatic photography comprising a resin dispersed in a non-aqueous solvent having an electric resistance of at least $10^9$ Ω cm and a dielectric constant of not higher than 3.5, wherein the dispersed resin is a copolymer resin obtained by polymerizing a solution containing at least one monofunctional monomer (A) which is soluble in the aforesaid non-aqueous solvent but becomes insoluble therein after being polymerized and at least one resin which is a polymer having at least a recurring unit represented by following formula (I), a part of the polymer being cross-linked, a polymerizable double bond group copolymerizable with said monomer (A) being bonded to one terminal only of at least one polymer main chain thereof, and said resin being soluble in the aforesaid non-aqueous solvent;

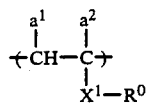

wherein $X^1$, $R^0$, $a^1$ and $a^2$ are as defined in the specification.

The liquid developer is capable of forming an offset printing plate precursor having excellent ink-receptivity to printing ink and excellent printing durability.

12 Claims, No Drawings

LIQUID DEVELOPER FOR ELECTROSTATIC PHOTOGRAPHY

FIELD OF THE INVENTION

This invention relates to a liquid developer for electrophotography, which comprises a resin dispersed in a liquid carrier having an electric resistance of at least $10^9$ Ω cm and a dielectric constant of not higher than 3.5, and more particularly to a liquid developer excellent in re-dispersibility, storability, stability, image-reproducibility, and fixability.

BACKGROUND OF THE INVENTION

In general, a liquid developer for electrophotography is prepared by dispersing an inorganic or organic pigment or dye such as carbon black, nitrosine, phthalocyanine blue, etc., a natural or synthetic resin such as an alkyd resin, an acrylic resin, rosine, synthetic rubber, etc., in a liquid having a high electric insulating property and a low dielectric constant, such as a petroleum aliphatic hydrocarbon, and further adding a polarily-controlling agent such as a metal soap, lecithin, linseed oil, a higher fatty acid, a vinyl pyrrolidone-containing polymer, etc. to the resulting dispersion.

In such a developer, the resin is dispersed in the form of insoluble latex grains having a grain size of from several μm to several hundred μm. In a conventional liquid developer, however, the soluble dispersion-stabilizing resin and the polarity-controlling agent are insufficiently bonded to the insoluble latex grains, so that the soluble dispersion-stabilizing resin and the polarity-controlling agent become freely dispersed in the liquid developer with ease. Accordingly, the soluble dispersion-stabilizing resin would be split off from the insoluble latex grains after storage of the liquid developer for a long period of time or after repeated use thereof, so that the grains would thereafter defectively precipitate, coagulate or accumulate, or the polarity would thereby become indistinct. Since the grains once coagulated and accumulated are reluctant to be redispersed, the grains would be adhered to everywhere in the developing machine, and, as a result, cause stain of images formed and malfunction of the developing machine such as clogging of the liquid-feeding pump.

In order to overcome such defects, a means of chemically bonding the soluble dispersion-stabilizing resin and the insoluble latex grains is disclosed in U.S. Pat. No. 3,990,980. However, the liquid developer disclosed was still insufficient, although the dispersion stability to spontaneous precipitation of the grains was improved in some degree. When the liquid developer was actually used in a developing apparatus, the toner adhered to parts of the apparatus and solidified to form a film thereon, and the thus solidified toner grains could hardly be re-dispersed. In addition, the solidified toner grains caused stain of the images duplicated and troubles in the apparatus. Accordingly, the liquid dispersion as disclosed in U.S. Pat. No. 3,990,980 was found to have a defect that the re-dispersion stability was still insufficient for practical use.

In accordance with the method of preparing the resin grains as disclosed in U.S. Pat. No. 3,990,980, there is an extreme limitation on the combination of the dispersing stabilizer to be used and the monomers to be insolubilized, in order to prepare monodispersed grains having a narrow grain size distribution. Mostly, the resin grains prepared by the method would contain a large amount of coarse grains having a broad grain size distribution, or would be polydispersed grains having two or more different mean grain sizes. In accordance with such a method, it is difficult to obtain mono-dispersed grains having a narrow grain size distribution and having a desired mean grain size, and the method often results in large grains having a grain size of 1 μm or more, or extremely fine grains having a grain size of 0.1 μm or less. In addition, the dispersion stabilizer to be used in the method has another problem in that it must be prepared by an extremely complicated process requiring a long reaction time.

In order to overcome the aforesaid defects, a method of forming insoluble dispersion resin grains of a copolymer from a monomer to be insolubilized and a monomer containing a long chain alkyl moiety, so as to improve the dispersibility, re-dispersibility and storage stability of the grains, has been disclosed in JP-A-60-179751 (corresponding to EP-A-155788) and JP-A62-151868 (the term "JP-A" as used herein means an "unexamined published Japanese patent application").

On the other hand, a method of printing a large number of prints of 5000 or more prints has recently been developed, using an offset printing master plate by electrophotography. In particular, because of further improvement of the master plate, it has become possible to print 10,000 or more prints of large size by electrophotography. In addition, noticeable progress has been made in shortening the operation time in an electrophotomechanical system, and the step of development-fixation in the system has been conveniently accelerated.

The grains prepared by the methods disclosed in aforesaid JP-A-60-179751 and JP-A-61-151868 might be good in the mono-dispersibility, re-dispersibility, and storage stability of the grains but showed unsatisfactory performance with respect to the printability for master plates of a large size and quickening of the fixation time.

Also, the dispersion resin grains prepared by the methods disclosed in aforesaid JP-A-60-185962 and 1-43757 were not always satisfactory in the points of the dispersibility and re-dispersibility of the grains and in the point of printability in the case of a shortened fixation time or in the case of master plates of a large size (e.g., A-3 size (297×420 mm²)) or larger.

SUMMARY OF THE INVENTION

This invention has been made for solving the aforesaid problems inherent in conventional liquid developers.

An object of this invention is to provide a liquid developer excellent in dispersion stability, re-dispersibility, and fixability, and in particular to provide a liquid developer excellent in dispersion stability, re-dispersibility, and fixability even in an electrophotomechanical system wherein the development-fixation step is quickened and master plates of a large size are used.

Another object of the present invention is to provide a liquid developer capable of forming an printing plate precursor having excellent ink-receptivity to printing ink and excellent printing durability by electrophotography.

Still another object of the present invention is to provide a liquid developer which is suitable for various electrostatic photographic uses and various transferring uses, in addition to the above-mentioned uses.

A further object of the present invention is to provide a liquid developer which can be used in any and every liquid developer-using system, for example, for ink-jet recording, cathode ray tube recording, or recording by pressure variation or electrostatic variation.

The above described objects can be attained by the present invention which is directed to a liquid developer for electrostatic photography comprising a resin dispersed in a non-aqueous solvent having an electric resistance of at least $10^9$ $\Omega$ cm and a dielectric constant of not higher than 3.5, wherein the dispersed resin is a copolymer resin obtained by polymerizing a solution containing at least one monofunctional monomer (A) which is soluble in the aforesaid non-aqueous solvent but becomes insoluble therein after being polymerized and at least one resin which is a polymer having at least a recurring unit represented by the following formula (I), a part of the polymer being crosslinked, a polymerizable double bond group copolymerizable with said monomer (A) being bonded to only one terminal of at least one polymer main chain thereof, and said resin being soluble in the aforesaid non-aqueous solvent;

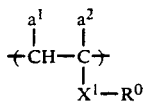

(I)

wherein $X^1$ represents —COO—, —OCO—, —CH$_2$OCO—, —CH$_2$COO—, —O— or —SO$_2$—; $R^0$ represents a hydrocarbon group having from 6 to 32 carbon atoms; and $a^1$ and $a^2$, which may be the same or different, each represents a hydrogen atom, a halogen atom, a cyano group, a hydrocarbon group having from 1 to 8 carbon atoms, —COO—$Z^1$ or —COO—$Z^1$ bonded via a hydrocarbon group having from 1 to 18 carbon atoms (wherein $Z^1$ represents a hydrogen atom or a hydrocarbon group having from 1 to 18 carbon atoms).

According to other embodiments of this invention, there is provided the liquid developer for electrostatic photography described above, wherein the solution for forming the copolymer resin by the polymerization thereof contains in addition to the monomer (A), a monomer (B) having an aliphatic group having at least 8 carbon atoms and represented by following formula (II) and capable of forming a copolymer with the monomer (A);

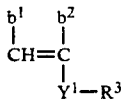

(II)

wherein $R^3$ represents an aliphatic group having at least 8 carbon atoms; $Y^1$ represents

—COO—, —CONH—, —CON—

(wherein $R^4$ represents an aliphatic group), —OCO—, —CH$^2$COO—, or —O—; and $b^1$ and $b^2$, which may be the same or different, each represents a hydrogen atom, an alkyl group, —COOR$^5$ or —CH$_2$—COOR$^5$ (wherein $R^5$ represents an aliphatic group).

Furthermore, according to still other embodiment of this invention, there is provided the liquid developer for electrostatic photography described above, wherein the solution for forming the copolymer resin by the polymerization thereof contains in addition to the monomer (A), a monomer (C) containing a polar group and/or a polar linkage group represented by following formula (III);

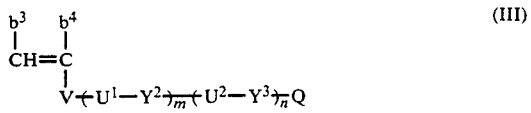

(III)

wherein V represents —O—, —COO—, —OCO—, —CH$_2$OCO—, —SO$_2$—, —CONH—, —SO$_2$NH—,

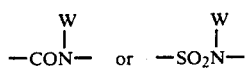

(wherein W represents a hydrocarbon group or has the same meaning as the linkage group $-(U^1-Y^2)_m-(U^2-Y^3)_n-Q$ in formula (III)); Q represents a hydrogen atom or a hydrocarbon group having from 1 to 18 carbon atoms, which may be substituted by a halogen atom, —OH, —CN, —NH$_2$, —COOH, —SO$_3$H or —PO$_3$H$_2$; $Y^2$ and $Y^3$, which may be the same or different, each represents

—O—, —S—, —CO—, —CO$_2$—, —OCO—, —SO$_2$—,

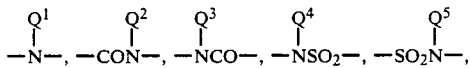

—NHCO$_2$—, or —NHCONH—(wherein $Q^1$, $Q^2$, $Q^3$, $Q^4$, and $Q^5$ each has the same meaning as aforesaid Q); $U^1$ and $U^2$, which may be the same or different, each represents a hydrocarbon group having from 1 to 18 carbon atoms which may be substituted or may have

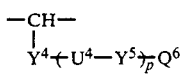

(wherein $Y^4$ and $Y^5$, which may be the same or different, have the same meaning as aforesaid $Y^2$ and $Y^3$; $U^4$ represents a hydrocarbon group having from 1 to 18 carbon atoms, which may be substituted, and $Q^6$ has the same meaning as aforesaid Q); $b^3$ and $b^4$, which may be the same or different, each represents a hydrogen atom, a hydrocarbon group, —COO—L, or —COO—L bonded through a hydrocarbon group (wherein L represents a hydrogen atom or a hydrocarbon group which may be substituted); and m, n, and p, which may be the same or different, each represents an integer of from 0 to 4.

DETAILED DESCRIPTION OF THE INVENTION

Then, the liquid developer of this invention is described in detail.

As the liquid carrier for the liquid developer of this invention having an electric resistance of at least $10^9$ $\Omega$ cm and a dielectric constant of not higher than 3.5, straight chain or branched aliphatic hydrocarbons, alicyclic hydrocarbons, aromatic hydrocarbons, and halogen-substituted derivatives thereof can be preferably used. Examples thereof are octane, isooctane, decane, isodecane, decalin, nonane, dodecane, isododecane, cyclohexane, cyclooctane, cyclodecane, benzene, toluene, xylene, mesitylene, Isopar E, Isopar G, Isopar H, Isopar L (Isopar: trade name of Exxon Co.), Shellsol 70, Shellsol 71 (Shellsol: trade name of Shell Oil Co.), Amsco OMS and Amsco 460 Solvent (Amsco: trade name of American Mineral Spirits Co.). They may be used singly or as a combination thereof.

The non-aqueous dispersion resin grains (hereinafter are often referred to as "latex grains") which are the most important constituting element in this invention are a copolymer resin obtained by polymerization-granulating a solution of at least one monofunctional monomer (A) and at least one polymer containing at least the recurring unit shown by the aforesaid formula (I), a part of the polymer being crosslinked, a polymerizable double bond group capable of copolymerizing with the monomer (A) being bonded to one terminal only of at least one polymer main chain, and said resin being soluble in a non-aqueous solvent in the non-aqueous solvent.

As the non-aqueous solvent for use in this invention, any solvents miscible with the aforesaid liquid carrier for the liquid developer for electrostatic photography can be basically used in this invention.

That is, the non-aqueous solvent being used in the production of the dispersion resin grains may be any solvent miscible with the aforesaid liquid carrier and preferably includes straight chain or branched aliphatic hydrocarbons, alicyclic hydrocarbons, aromatic hydrocarbons, and halogen-substituted derivatives thereof. Specific examples thereof are hexane, octane, isooctane, decane, isodecane, decalin, nonane, isododecane, and isoparaffinic petroleum solvents such as Isopar E, Isopar G, Isopar H, Isopar L, Shellsol 70, Shellsol 71, Amsco OMS, and Amsco 460. They may be used singly or as a combination thereof.

Other solvents which can be used together with the aforesaid organic solvent in this invention include alcohols (e.g., methanol, ethanol, propyl alcohol, butyl alcohol, and fluorinated alcohols), ketones (e.g., acetone, methyl ethyl ketone, and cyclohexanone), carboxylic acid esters (e.g., methyl acetate, ethyl acetate, propyl acetate, butyl acetate, methyl propionate, and ethyl propionate), ethers (e.g., diethyl ether, dipropyl ether, tetrahydrofuran, and dioxane), and halogenated hydrocarbons (e.g., methylene dichlorine, chloroform, carbon tetrachloride, dichloroethane, and methyl chloroform).

It is preferred that the non-aqueous solvents which are used as a mixture thereof are distilled off by heating or under a reduced pressure after the polymerization granulation. However, even when the solvent is carried in the liquid developer as a dispersion of the latex grains, it gives no problem if the liquid electric resistance of the developer is in the range of satisfying the condition of at least $10^9$ Ω cm.

In general, it is preferred that the same solvent as the liquid carrier is used in the step of forming the resin dispersion and as such a solvent, there are straight chain or branched aliphatic hydrocarbons, alicyclic hydrocarbons, aromatic hydrocarbons, halogenated hydrocarbons, etc., as described above.

It is a feature of this invention that the dispersion stabilizer (dispersion stabilizing resin) of this invention necessary for obtaining a stable resin dispersion from the polymer insoluble in the non-aqueous solvent formed by polymerizing the monomer (A) in the non-aqueous solvent is a resin soluble in the non-aqueous solvent, said resin being a polymer having at least the recurring unit shown by formula (I) described above, a part of the polymer being crosslinked and a polymerizable double bond group capable of copolymerizing with the monomer (A) being bonded to only one terminal of at least one polymer main chain.

Then, the dispersion stabilizer (dispersion stabilizing resin) in this invention is explained in detail.

In formula (I) showing the recurring unit of the polymer component, the hydrocarbon groups may be substituted.

In fOrmula (I), $X^1$ preferably represents —COO—, —OCO—, —CH$_2$OCO—, or —CH$_2$COO—.

$R^0$ preferably represents a hydrocarbon group having from 8 to 22 carbon atoms and includes practically aliphatic groups such as octyl, decyl, dodecyl, tridecyl, tetradecyl, hexadecyl, octadecyl, docosanyl, eicosanyl, octenyl, decenyl, dodecenyl, tridecenyl, tetradecenyl, hexadecenyl, octadecenyl, dococenyl, etc.

In formula (I), $a^1$ and $a^2$, which may be the same or different, each preferably represents a hydrogen atom, a halogen atom (e.g., fluorine, chlorine, and bromine), a cyano group, a hydrocarbon group having from 1 to 6 carbon atoms (e.g., methyl, ethyl, propyl, butyl, and phenyl), —COO—$Z^1$ or —COO—$Z^1$ bonded via a hydrocarbon group having from 1 to 6 carbon atoms [wherein $Z^1$ represents a hydrogen atom or a hydrocarbon atom having from 1 to 18 carbon atoms (e.g., methyl, ethyl, propyl, butyl, hexyl, octyl, decyl, dodecyl, tridecyl, tetradecyl, hexadecyl, octadecyl, butenyl, hexenyl, octenyl, decenyl, benzyl, phenethyl, phenyl, chlorobenzyl, bromobenzyl, methylbenzyl, chlorophenyl, bromophenyl, and tolyl)] . More preferably, either $a^1$ or $a^2$ represents a hydrogen atom.

The polymer in this invention may further have recurring units other than that shown by formula (I) described above and as such a recurring unit, any monofunctional monomer capable of copolymerizing with a monomer corresponding to the recurring unit shown by formula (I).

Practical examples of such recurring unit are those shown by following formula (I-1).

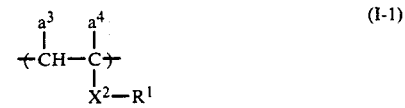

wherein $X^2$ represents —COO—, —OCO—, —CH$_2$OCO—, —CH$_2$COO—,

—SO$_2$—, —O—, —S—, —CON—, —SO$_2$N—,
$\quad\quad\quad\quad\quad\quad\quad\quad\;\;\;|\quad\quad\quad|$
$\quad\quad\quad\quad\quad\quad\quad\quad\;\;W^1\quad\;\;W^1$

—NHCO—, —CH$_2$NHCO—,

—NHSO$_2$—, —CH$_2$NHSO$_2$—, —CONHCOO—, —CONHSO$_2$—, —NHCONH— and 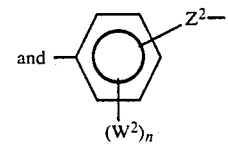

In the above formulae, $W^1$ represents a hydrogen atom or a substituted or unsubstituted hydrocarbon group having from 1 to 18 carbon atoms (e.g., methyl, ethyl, propyl, butyl, hexyl, octyl, decyl, dodecyl, tridecyl, octadecyl, 2-hydroxyethyl, 3-hydroxypropyl, 2-chloroethyl, 2-cyanoethyl, 2-methoxycarbonylethyl, 2-carboxyethyl, butenyl, hexenyl, octenyl, cyclohexyl, benzyl, phenethyl, phenyl, tolyl, naphthyl, chlorophenyl, bromophenyl, methoxyphenyl, bromobenzyl, methylbenzyl, and methoxybenzyl) and $W^2$ represents a hydrogen atom, a halogen atom (e.g., fluorine, chlorine, and bromine), an alkyl group (e.g., methyl, ethyl, propyl, chloromethyl, hydroxymethyl, N,N-dimethylaminomethyl, and N,N-diethylaminomethyl), a hydroxy group, a carboxy group or a sulfo group. In the above formula, n represents an integer of from 1 to 4.

In the above formula, $Z^2$ represents a linkage group or a bond being bonded to $R^1$ of the benzene ring and is, for example, $$-COO-, -CON-, -CH_2O-,$$
$$\quad\quad\quad\ |$$
$$\quad\quad\quad W^3$$

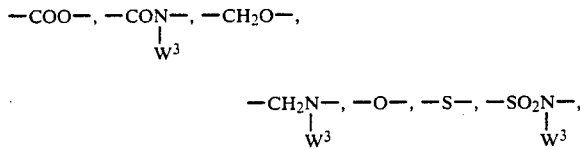

a bond directly bonding to $R^1$ of the benzene ring, etc., ($W^3$ has the same meaning as $W^1$).

In formula (I-1), $R^1$ represents a hydrogen atom, an unsubstituted hydrocarbon group having from 1 to 6 carbon atoms (e.g., methyl, ethyl, propyl, butyl, heptyl, hexyl, cycloheptyl, cyclohexyl, hexenyl, and phenyl), a substituted aliphatic group having from 1 to 22 carbon atoms (in which examples of the substituent include a halogen atom (e.g., fluorine, chlorine, bromine, and iodine), —OH, —SH, —COOH, —SO$_3$H, —SO$_2$H, PO$_3$H$_2$, —CN

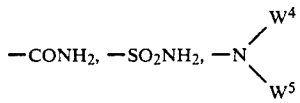

(wherein $W^4$ and $W^5$ each has the same meaning as $W^1$),

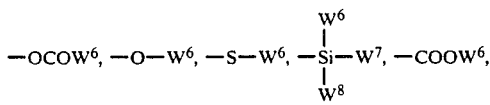

—SO$_2$W$^6$ (wherein $W^6$, $W^7$, and $W^8$ each represents a hydrocarbon group having from 1 to 18 carbon atoms, which may be substituted, and has practically the same meaning as $W^1$)], a heterocyclic group (e.g., thiophene pyran, furan, pyridine, morpholine, piperidine imidazole, benzimidazole, and thiazole), or an aromatic group which may be substituted (e.g., phenyl, naphthyl, tolyl, xylyl, mesityl, fluorophenyl, chlorophenyl bromophenyl, dichlorophenyl, dibromophenyl trifluoromethylphenyl, hydroxyphenyl, methoxyphenyl, carboxyphenyl, sulfophenyl, carboxyamidophenyl, sulfoamidophenyl, methoxycarbonylphenyl, acetamidophenyl, cyanophenyl, nitrophenyl, and methanesulfonylphenyl).

In formula (I-1), $a^3$ and $a^4$, which may be the same or different, each has the same meaning as $a^1$ and $a^2$ in formula (I) described above.

Furthermore, the polymer in this invention may contain monomers other than the monomer corresponding to the recurring unit shown by aforesaid formula (I-1) and examples thereof are maleic acid, maleic anhydride, itaconic anhydride, vinylnaphthalenes, and vinyl heterocyclic compounds having a vinyl group directly substituted to the ring (e.g., vinylpyridine, vinylimidazole, vinylthiophene, vinylpyrrolidone, vinylbenzoimidazole, and vinyltriazole).

The dispersion stabilizing resin of this invention is a polymer containing a polymer component selected from the recurring units shown by formula (I) as the homopolymer component or as a copolymer component obtained by copolymerizing with another monomer copolymerizable with the monomer corresponding to the recurring unit shown by (I) (e.g., a monomer corresponding to the recurring unit shown by aforesaid formula (I-1), a part of the polymer being crosslinked, and a polymerizable double bond group being bonded to only one terminal of at least one polymer main chain.

When the dispersion stabilizing resin of this invention contains a monomer corresponding to the recurring unit shown by formula (I) as the copolymer component obtained by copolymerizing the monomer and other monomer copolymerizable with the monomer (e.g., a monomer corresponding to the recurring unit shown by aforesaid formula (I-1), the proportion of the monomer corresponding to the recurring unit shown by formula (I) is at least 30 parts by weight, preferably at least 50 parts by weight, and more preferably at least 70 parts by weight to 100 parts by weight of the whole monomers.

As a method of introducing the crosslinked structure into the polymer, a conventional method can be utilized.

That is, there is a method of polymerizing in the co-existence of a polyfunctional monomer or a method of incorporating a functional group progressing a crosslinking reaction and performing the crosslinking by polymer reaction. A method of crosslinking the polymer and chain by polymerizing a monomer having at least two functional groups and a monomer corresponding to the recurring unit shown by formula (I) is preferred.

Practical examples of the polymerizable functional groups include

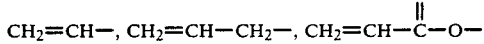

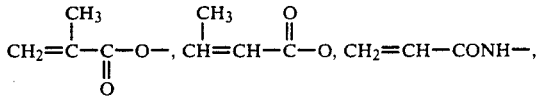

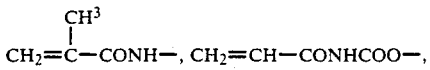

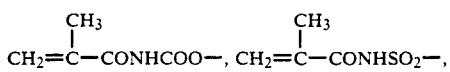

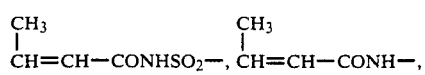

-continued

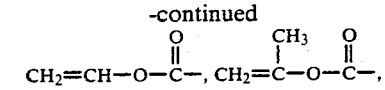

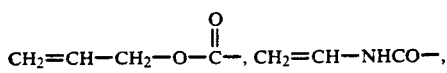

CH₂=CH—CH₂—NHCO—, CH₂=CH—SO₂—,

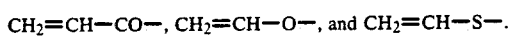

monomer may have two or more the aforesaid polymerizable functional groups and in this case they may be the same or different.

Practical examples of the monomer having two or more polymerizable functional groups are as follows.

Examples of the monomer having same polymerizable functional groups are styrene derivatives such as divinylbenzene, trivinylbenzene, etc.; methacrylic acid, acrylic acid, or crotonic acid esters of a polyhydric alcohol (e.g., ethylene glycol, diethylene glycol, triethylene glycol, polyethylene glycols #200, #400, and #600, 1,3-butylene glycol, neopentyl glycol, dipropylene glycol, polypropylene glycol, trimethylolpropane, trimethylolethane, and pentaerythritol) or a polyhydroxyphenol (e.g., hydroquinone, resorcinol, catechol, and the derivative thereof), vinyl ethers, and allyl ethers; vinyl esters of a dibasic acid (e.g., malonic acid, succinic acid, glutaric acid, adipic acid, pimelic acid, maleic acid, phthalic acid, and itaconic acid), allyl esters, vinylamides, and allyl amides; and condensates of polyamines (e.g., ethylenediamine, 1,3propylenediamine, and 1,4-butylenediamine) and a carboxylic acid having a vinyl group (e.g., methacrylic acid, acrylic acid, crotonic acid, and allylacetic acid).

Also, examples of the monomer having different polymerizable functional groups are vinyl group-having ester derivatives or amide derivatives (e.g., vinyl methacrylate, vinyl acrylate, vinyl itaconate, allyl itaconate, allyl acrylate, allyl itaconate, vinyl methacryloylacetate, vinyl methacryloylpropionate, allyl methacryloylpropionate, methacrylic acid vinyloxycabonyl methyl ester, acrylic acid vinyloxycarbonylmethyloxycarbonylethylene ester, N-allylacrylamide, N-allylmethacrylamide, N-allylitaconic acid amide, and methacryloylpropionic acid allyl amide) of vinyl group-having carboxylic acids (e.g., methacrylic acid, acrylic acid, methacryloylacetic acid, acryloylacetic acid, methacryloylpropionic acid, acryloylpropionic acid, itaconiloylacetic acid, itaconoloylpropionic acid, and reaction products of carboxylic acids and alcohols or amines (e.g., allyloxycarbonylpropionic acid, allyloxycarbonylacetic acid, 2-allyloxycarbonylbenzoic acid, and allylaminocarbonylpropionic acid)); and condensates of aminoalcohols (e.g., aminoethanol, 1-aminopropanol, 1-aminobutanol, 1-aminohexanol, and 2-aminobutanol) and vinyl group-having carboxylic acids.

In this invention, by performing the polymerization using the monomer having two or more polymerizable functional groups in an amount of not more than 15% by weight, and preferably not more than 10% by weight of whole monomers, the partially crosslinked resin can be formed.

Also, the polymerizable double bond group bonding to only one terminal of the polymer chain has a chemical structure of directly bonding to one terminal of the polymer main chain or bonding thereto through an optional linkage group.

Practically, the polymerizable double bond groups has the chemical structure shown by formula (III).

wherein T¹ has the same meaning as Y¹ in the aforesaid formula (II); d¹ and d², which may be the same or different, each has the same significance as b¹ and b² in the aforesaid formula (II); and Q¹ represents a linkage group capable bonding

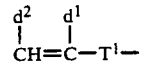

to one terminal of the polymer main chain directly or through an optional linkage group.

The linkage group is composed of an optional combination of the atomic groups of a carbon-carbon bond (single bond or double bond), a carbon-hetero atom bond (examples of the hetero atom are oxygen, sulfur, nitrogen, and silicon), or a hetero atom-hetero atom bond.

Examples of the linkage group are

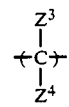

(wherein Z³ and Z⁴ each represents a halogen atom (e.g., fluorine, chlorine, and bromine), a cyano group, a hydroxy group, an alkyl group (e.g., methyl, ethyl, and propyl)),

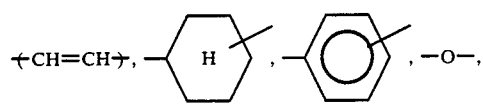

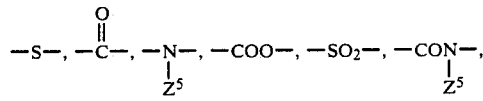

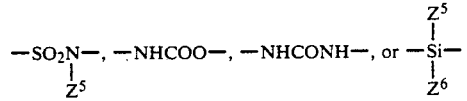

(wherein Z⁵ and Z⁶ each represents a hydrogen atom a hydrocarbon group having from 1 to 8 carbon atoms (e.g., methyl, ethyl, propyl, butyl, pentyl, hexyl, benzyl, phenethyl, phenyl, and tolyl), or —OZ⁷ (wherein Z⁷ has the same meaning as the hydrocarbon group shown by Z⁵)).

Then, the polymerizable double bond group shown by formula (II-1) described above is practically explained. In the following practical examples, A represents —CH₃H or —CH₂COOCH₃; B represents —H or —CH₃; n represents an integer of from 2 to 10; m represents 2 or 3; e represents 1, 2, or 3; p represents an integer of from 1 to 4; and q represents 1 or 2.

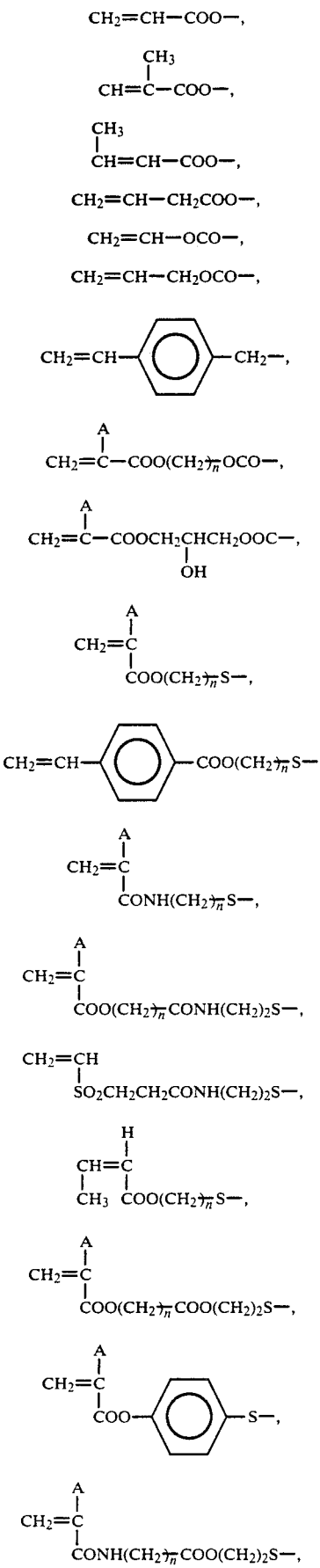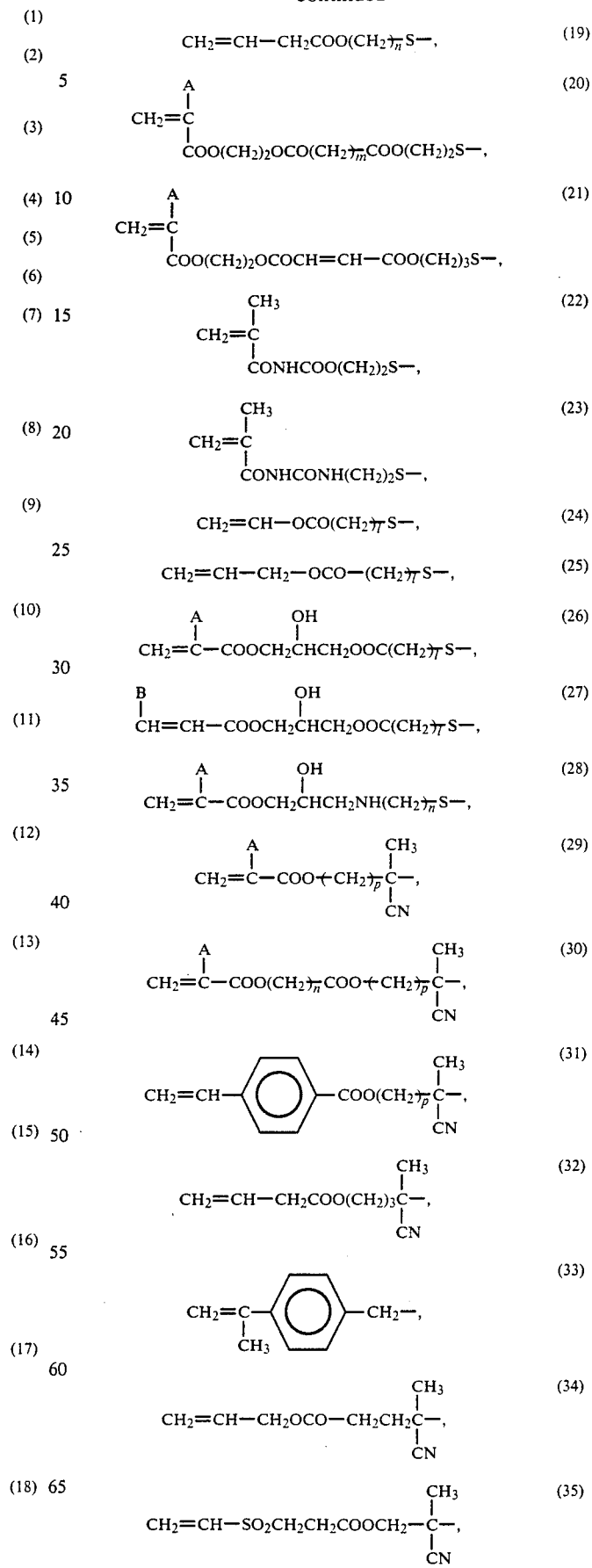

-continued

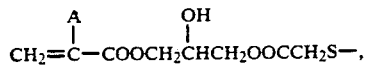  (36)

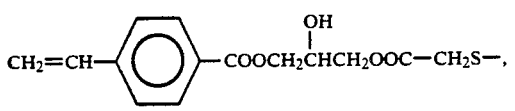  (37)

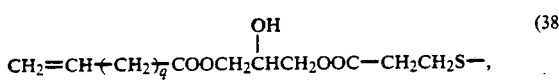  (38)

The dispersion stabilizing resin of this invention, wherein the polymerizable double bond group is bonded to only one terminal of the polymer main chain can be easily produced by, for example, a method of reacting a reagent having a double bond group to the terminal of a living polymer obtained by a conventionally known anionic polymerization or cationic polymerization or after reacting a reagent having a "specific reactive group" (e.g., —OH, —COOH, —SO$_3$H, NH$_2$, —SH—, —PO$_3$H$_2$, —NCO, —NCS,

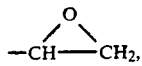

—COCl, and —SO$_2$Cl) to the terminal of the aforesaid living polymer, introducing a polymerizable double bond group into the reaction product by a high molecular reaction (a method by an ionic polymerization method), or a method of introducing the polymerizable double bond group into the molecule by conducting a radical polymerization using a polymerization initiator and/or a chain transfer agent each containing the aforesaid "specific reactive group" in the molecule, and, thereafter, performing a high molecular reaction utilizing the "specific reactive group" bonded to only one terminal of the polymer main chain.

Practically, the polymerizable double bond group can be introduced according to the methods described in P Dreyfuss & R. P. Quirk, *Encycl. Polym. Sci. Enq.*, 7, 551(1987), Yoshiki Nakajoo and Yuya Yamashita, *Senryo to Yakuhin (Dyes and Chemicals)*, 30, 232(1985), Akira Ueda and Susumu Nagai, *Kagaku to Koqvo (Science and Industry)*, 60 57(1986), P. F. Rempp & E. Franta, *Advances in Polymer Science*, 58, 1(1984), Koichi Ito, *Kobunshi Kako (Polymer Processing)*, 35, 262(1986), V. Perce, *Applied Polymer Science*, 285, 97(1985), etc., and the literature references cited in the above publications.

Practically, a polymer having a crosslinking structure and having the "specific reactive group" bonded to only one terminal of the polymer main chain can be produced by (1) a method of polymerizing a mixture of at least one kind of the monomer corresponding to the recurring unit shown by formula (I), the aforesaid polyfunctional monomer for introducing the crosslinking structure, and a chain transfer agent having the aforesaid "specific reactive group" in the molecule using a polymerization initiator (e.g., an azobis compound and a peroxide), (2) a method of performing the aforesaid polymerization using a polymerization initiator having the aforesaid "specific reactive group" in the molecule in place of using the aforesaid chain transfer agent, or (3) a method of performing the polymerization using a chain transfer agent and a polymerization initiator each containing the aforesaid "specific reactive group" in the molecule. Then, the polymerizable double bond group is introduced into the polymer by performing a high molecular reaction utilizing the "specific reactive group".

Examples of the chain transfer agent include mercapto compounds each having the "specific reactive group" or a substituent capable of being induced into the "specific reactive group" (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)carbamoyl]propionic acid, 3-[N-(2-mercaptoethyl)amino]propionic acid, N-(3-mercaptopropionyl) alanine, 2-mercaptoethanesulfonic acid, 3mercaptopropanesulfonic acid, 4-mercaptobutanesulfonic acid, 2-mercaptoethanol, 1-mercapto-2-propanol, 3-mercapto-2butanol, mercaptophenol, 2-mercaptoethylamine, 2-mercaptoimidazole, and 2-mercapto-3pyridinol) and iodized alkyl compounds each containing the "specific reactive group" or a substituent capable being induced into the "specific reactive group" (e.g., indoacetic acid, iodopropionic acid, 2-iodoethanol, 2-iodoethanesulfonic acid, and 3-iodopropanesulfonic acid). In these compounds, the mercapto compounds are preferred.

Also, examples of the polymerization initiator containing the "specific reactive group" or a substituent capable of being induced into the "specific reactive group" include 4,4'-azobis(4-cyanovaleric acid), 4,4'azobis(4-cyanovaleric acid chloride), 2,2'-azobis(2-cyanopropanol), 2,2'-azobis(2-cyanopentanol), 2,2'-azobis[2-(5-hydroxy-3,4,5,6-tetrahydropyrimidin-2-yl)-propane], 2,2'-azobis{2-methyl-N-[1,1-bis(hydroxymethyl)-2-hydroxyethyl]propioamide}, 2,2'-azobis{2-methyl-N-[1,1-bis(hydroxymethyl)ethyl]propioamide}, 2,2'-azobis[2-methyl-N-(2-hydroxyethyl)propioamide], and 2,2'-azobis(2-amidinopropane).

The amount of the chain transfer agent or the polymerization initiator is from about 0.5 to about 15 arts by weight, and preferably from 1 to 10 parts by weight to 100 parts by weight of the whole monomers.

The dispersion stabilizing resin for use in this invention may be soluble in an organic solvent, and practically the dispersion stabilizing resin at least 5 parts by weight of which is soluble in 100 parts by weight of toluene at 25° C. may be used in this invention.

The weight average molecular weight of the dispersion stabilizing resin for use in this invention is from $1 \times 10^4$ to $1 \times 10^6$, and preferably from $3 \times 10^4$ to $5 \times 10^5$.

The monomers which are used in the production of the non-aqueous dispersion resin in this invention can be classified into a monofunctional monomer (A) which is soluble in the non-aqueous solvent but becomes insoluble therein by being polymerized, a monomer (B) which contains an aliphatic group of at least 8 carbon atoms and forming a copolymer with the monomer (A), and a monomer (C) having at least 2 polar groups and/or polar linkage groups shown by aforesaid formula (III) and copolymerizable with the monomer (A).

The monomer (A) which can be used in this invention includes any monofunctional monomer which is soluble in a non-aqueous solvent but becomes insoluble therein by being polymerized. Practically, there are monomers shown by following formula (IV);

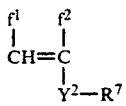 (IV)

wherein Y² represents —COO—, —OCO—, —CH₂OCO—, —CH₂COO—,

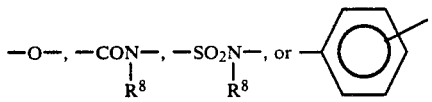

wherein R⁸ represents a hydrogen atom or an aliphatic group having from 1 to 18 carbon atoms, which may be substituted (e.g., methyl, ethyl, propyl, butyl, 2-chloroethyl, 2-bromoethyl, 2cyanoethyl, 2-hydroxyethyl, benzyl, chlorobenzyl, methylbenzyl, methoxybenzyl, phenethyl, 3-phenylpropyl, dimethylbenzyl, fluorobenzyl, 2-methoxyethyl, and 3methoxypropyl)..

In formula (IV), R⁷ represents a hydrogen atom or an aliphatic group having from 1 to 6 carbon atoms, which may be substituted (e.g., methyl, ethyl, propyl, butyl, 2-chloroethyl, 2,2-dichloroethyl, 2,2,2-trifluoroethyl, 2-bromoethyl, 2-glycidylethyl, 2-hydroxyethyl, 2-hydroxypropyl, 2,3-dihydroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, N,N-dimethylaminoethyl, N,N-diethylaminoethyl, trimethoxysilylpropyl, 3-bromopropyl, 4-hydroxybutyl, 2furfurylethyl, 2-thienylethyl, 2-pyridylethyl, 2-morpholinoethyl, 2-carboxyethyl, 3-carboxypropyl, 4-carboxybutyl, 2-phosphoethyl, 3-sulfopropyl, 4-sulfobutyl, 2carboxyamidoethyl, 3-sulfoamidopropyl, 2-N-methylcarboxyamidoethyl, cyclopentyl, chlorocyclohexyl, and dichlorohexyl).

In formula (IV), f¹ and f², which may be the same or different, each has the same meaning as a¹ and a² in aforementioned formula (I).

Specific examples of monofunctional monomer (A) include vinyl esters or allyl esters of aliphatic carboxylic acids having from 1 to 6 carbon atoms (e.g., acetic acid, propionic acid, butyric acid, monochloroacetic acid, and trifluoropropionic acid); alkyl esters or alkylamides (the alkyl moiety having from 1 to 4 carbon atoms) of an unsaturated carboxylic acid such as acrylic acid, crotonic acid, itaconic acid, maleic acid, etc., (the alkyl group includes, for example, methyl, ethyl, propyl, butyl, 2-chloroethyl, 2-bromoethyl, 2-fluoroethyl, trifluoroethyl, 2-hydroxyethyl, 2-cyanoethyl, 2-nitroethyl, 2-methoxyethyl, 2-methanesulfonylethyl, 2-benzenesulfonylethyl, 2-(N,N-dimethylamino)ethyl, 2-(N,N-diethylamino)ethyl, 2-carboxyethyl, 2-phosphoethyl, 4-carboxybutyl, 3-sulfopropyl, 4-sulfobutyl, 3-chloropropyl, 2-hydroxy-3-chloropropyl, 2-furfurylethyl, 2-pyridinylethyl, 2-thienylethyl, trimethoxysilylpropyl, and 2-carboxyamidoethyl); styrene derivatives (e.g., styrene, vinyltoluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene, N,N-dimethylaminomethylstyrene, vinylbenzenecarboxyamide, and vinylbenzenesulfoamide); unsaturated carboxylic acids such as acrylic acid, methacrylic acid, crotonic acid, maleic acid, itaconic acid, etc.; cyclic anhydrides of maleic acid and itaconic acid; acrylonitrile; methacrylonitrile; and heterocyclic compounds having a polymerizable double bond group (practical examples are the compounds described in Polymer Date Handbook, Foundation, pages 175 to 184, edited by Polymer Society of Japan, 1986, such as N-vinylpyridine, N-vinylimidazole, N-vinylpyrrolidone, vinylthiophene, vinyltetrahydrofuran, vinyloxazoline, vinylthiazole, N-vinylmorpholine, etc).

The monofunctional monomers (A) may be used singly or as a mixture thereof.

Then, the monomer (B) shown by formula (II) for use in this invention is further explained.

In formula (II) described above, it is preferred that R³ represents an alkyl group having a total carbon atom number of at least 10, which may be substituted, or an alkenyl group having a total carbon atom number of at least 10; Y¹ represents

(wherein R⁴ preferably represents an aliphatic group having from 1 to 32 carbon atoms (examples of the aliphatic group are alkyl, alkenyl, and aralkyl)), —OCO—, —CH₂OCO—, or —O—; and b¹ and b², which may be the same or different, each represents a hydrogen atom, a methyl group, —COOR⁵, or —CH₂COOR⁵ (wherein R⁵ preferably represents an aliphatic group having from 1 to 32 carbon atoms, such as an alkyl group, an alkenyl group, and a cycloalkyl group.

Furthermore, more preferably, Y¹ in formula (II) represents

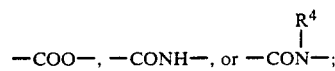

b¹ and b², which may be the same or different, each represents a hydrogen atom or a methyl group; and R³ is as described above.

Practical examples of the monomer shown by formula (II) as described above are esters of unsaturated carboxylic acids (e.g., acrylic acid, methacrylic acid, crotonic acid, maleic acid, and itaconic acid) having an aliphatic group of from 10 to 32 total carbon atoms (the aliphatic group may have one or more substituents such as a halogen atom, a hydroxy group, an amino group, or an alkoxy group or the main chain thereof may contain a linking hetero atom such as oxygen, sulfur, nitrogen, etc.; examples of the aliphatic group are decyl, dodecyl, tridecyl, tetradecyl, hexadecyl, octadecyl, docosanyl, dosenyl, hexadecenyl, oleyl, linoleyl, and docosenyl); amides of the aforesaid unsaturated carboxylic acids (the aliphatic groups are same as those shown on the esters); vinyl esters or allyl esters of higher fatty acids (examples of the higher fatty acid are lauric acid, myristic acid, stearic acid, oleic acid, linolic acid, and behenic acid); and vinyl esters substituted by an aliphatic group having from 10 to 32 total carbon atoms (the aliphatic groups are same as the aliphatic groups of the unsaturated carboxylic acids described above).

Then, the monomer (C) shown by formula (III) for use in this invention is explained in detail.

In formula (III), V represents preferably —O—,

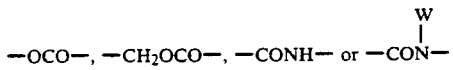

[wherein W represents preferably an alkyl group, which may be substituted, having from 1 to 16 total carbon atoms, an alkenyl group, which may be substituted, having from 2 to 16 total carbon atoms, an aliphatic group, which may be substituted, having from 5 to 18 total carbon atoms, or the linkage group $-(U^1-y^2)_{\overline{m}}-(U^2-y^3)_{\overline{n}}Q$ in formula (III)].

In formula (III), Q represents preferably a hydrogen atom, a halogen atom (e.g., chlorine and bromine), or an aliphatic group having from 1 to 16 total carbon atoms (e.g., alkyl, alkenyl, and aralkyl), which may be substituted by —OH, —CN, or —COOH.

$y^2$ and $y^3$, which may be the same or different, each represents preferably —O—, —S—, —CO—, —COO—, —OCO—,

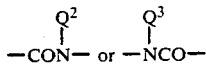

(wherein $Q^2$ and $Q^3$ each has the same meaning as Q described above).

In formula (III), $U^1$ and $U^2$, which may be the same or different, each represents preferably a hydrocarbon group having from 1 to 12 carbon atoms (e.g., an alkylene group, an alkenylene group, an arylene group, and a cycloalkylene group), which may be substituted or may have

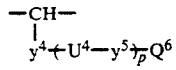

(wherein $Y^4$ and $Y^5$, which may be the same or different, have the same meaning as $y^2$ and $y^3$ described above; $U^4$ represents an alkylene group having from 1 to 12 carbon atoms, an alkenylene group, or an arylene group, which may be preferably substituted; and $Q^6$ has the same meaning as aforesaid Q) in the main chain bond.

In formula (III), $b^3$ and $b^4$, which may be the same or different, each represents preferably a hydrogen atom, a methyl group, —COO—L or —CH$_2$COO—L (wherein L represents a hydrogen atom, an alkyl group having from 1 to 18 alkyl group, an alkenyl group, an aralkyl group, or a cycloalkyl group).

Furthermore, m, n, and p, which may be the same or different, each represents preferably 0, 1, 2, or 3.

In a more preferred embodiment of formula (III), V represents —COO—, —CONH—, or

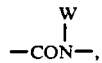

and $b^3$ and $b^4$, which may be the same or different, each represents a hydrogen atom, a methyl group, —COO—L or —CH$_2$COO—L (wherein L represents more preferably an alkyl group having from 1 to 12 carbon atoms).

Furthermore, in practical examples of $U^1$ and $U^2$ of formula (III), each of $U^1$ and $U^2$ is composed of an optional combination of an atomic group such as

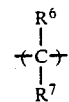

(wherein $R^6$ and $R^7$ each represents a hydrogen atom, an alkyl group, a halogen atom, etc.),

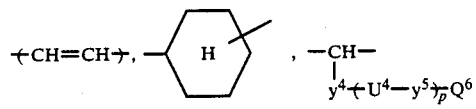

(wherein $y^4$, $y^5$, $Q^6$, $U^4$, and p have the same meaning as described above), etc.

Also, in the linkage group $V-(U^1-y^2)_{\overline{m}}-(U^2-y^3)_{\overline{n}}Q$ in formula (III), the linked main chain composed of V, $U^1$, $y^2$, $U^2$, $y^3$, and Q has preferably at least 8 total carbon atoms. In this case, when V represents

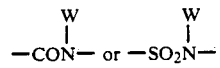

and W represent $-(U^1-y^2)_{\overline{m}}-(U^2-y^3)_{\overline{n}}Q$, the linked main chain composed of W in included in the aforesaid linked main chain. Furthermore, when $U^1$ and $U^2$ each is a hydrocarbon group having the linkage group

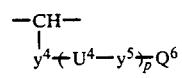

in the main chain bond, $y^4-(U^4-y^5)_{\overline{p}}Q^6$ is also included in the aforesaid linked main chain.

The number of atoms of the linked main chain does not include an oxo group (=o) or a hydrogen atom when V represents —COO— or —CONH— and the carbon atoms, ether-type oxygen atom(s), and nitrogen atom(s) constituting the linked main chain are included in the atom number. Accordingly, the atom number of —COO— and —CONH— is 2. Similarly, when Q represents, for example, —C$_9$H$_{19}$, the hydrogen atoms are not included as the atom number and the carbon atoms are included. Thus, in this case, the number of atoms is 9.

Then specific examples of the monomer (C) are illustrated below, which, however, are not intended to restrict the scope of this invention.

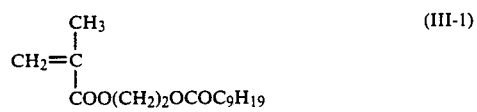  (III-1)

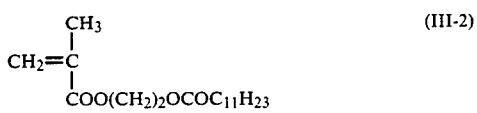  (III-2)

  (III-3)

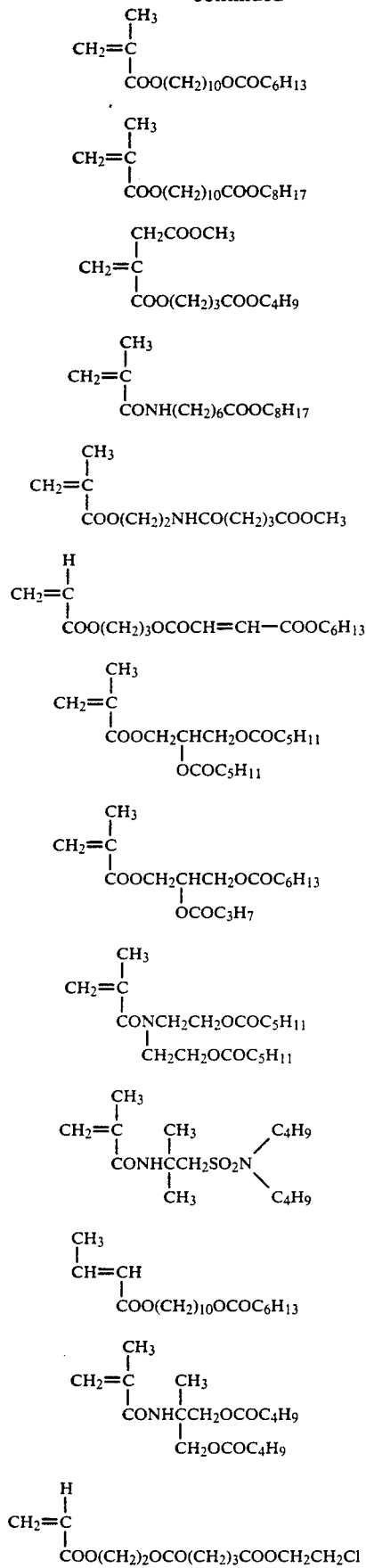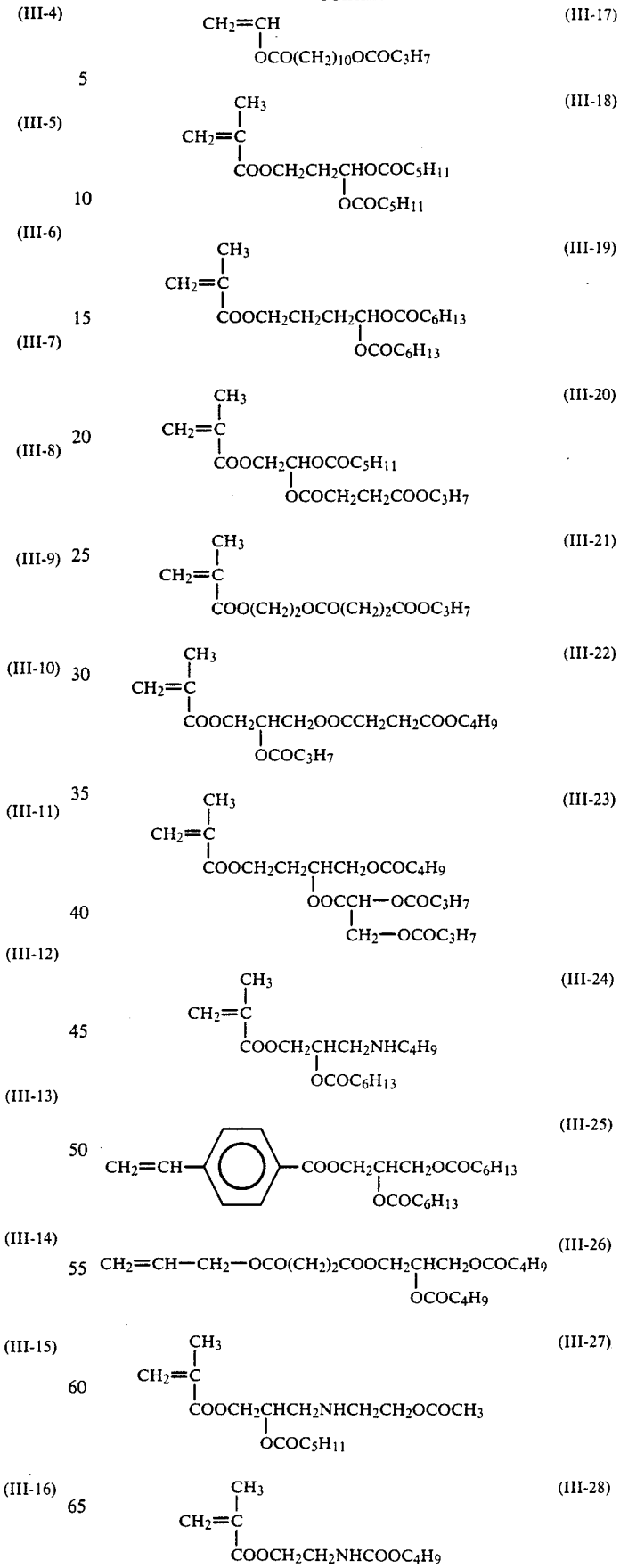

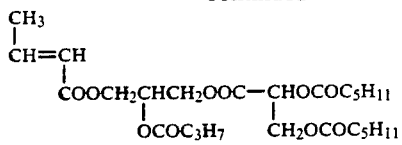

(III-29)

The dispersion resin for use in the liquid developer of this invention comprises the monomer (A) or a mixture of the monomer (A) and at least one of the monomers (B) and (C) as described above and it is important that the resin produced from the aforesaid monomer or monomers is insoluble in the aforesaid non-aqueous solvent and in this case, the desired dispersion resin can be obtained.

When the monomer (A) is used together with the monomer (B) shown by formula (II) or the monomer (C) shown by formula (III), the monomer (B) is used in an amount of preferably from 0.1 to 20% by weight, and more preferably from 0.3 to 8% by weight of the monomer (A) being used for insolubilizing the resin formed in the aforesaid non-aqueous solvent and the monomer (C) is used in an amount of preferably from 0.1 to 30% by weight, and more preferably from 0.2 to 10% by weight of the monomer (A).

Also, the molecular weight of the dispersion resin of this invention is preferably from $10^3$ to $10^6$, and more preferably from $10^4$ to $10^6$.

For producing the dispersion resin for use in this invention, the aforesaid dispersion stabilizing resin and the monomer (A) or the aforesaid dispersion stabilizing resin, the monomer (A), and the monomer (B) or (C) are polymerized by heating in the presence of a polymerization initiator such as benzoyl peroxide, azobisisobutyronitrile, and butyl lithium in a non-aqueous solvent.

Practically, the dispersion stabilizing resin can be produced by a method (1) wherein the polymerization initiator is added to a solution having dissolved therein the dispersion stabilizing resin and the monomer (A) or the dispersion stabilizing resin, the monomer (A), and the monomer (B) or (C), a method (2) wherein the monomer (A) or the monomer (A) and the monomer (B) or (C) are added to a solution having dissolved therein the dispersion stabilizing resin together with the polymerization initiator, a method (3) wherein a part of the monomer (A) or a part of the monomer (A) and the monomer (B) or (C) are added together with the polymerization stabilizer to a solution containing the whole amount of the dispersion stabilizing resin and the rest of the monomer (A) or the rests of the monomer (A) and he monomer (B) or (C), or a method (4) wherein a mixture cf a solution of the dispersion stabilizing resin and a solution of the monomer (A) or the monomer (A) and the monomer (B) or (C) is added to a non-aqueous solvent together with the polymerization initiator.

The amount of the monomer (A) or (B) is from about 5 to about 80 parts by weight, and preferably from 10 to 50 parts by weight per 100 parts by weight of the non-aqueous solvent and the amount of the monomer (C) is from about 3 to about 80 parts by weight, and preferably from 5 to 50 parts by weight per 100 parts by weight of the non-aqueous solvent.

The amount of the soluble dispersion stabilizing resin (I) which is a dispersion stabilizer for the liquid developer of this invention is from about 1 to about 100 parts by weight, and preferably from 5 to 50 parts by weight per 100 parts by weight of the monomer or monomers (A), (B) and (C).

The amount of the polymerization initiator being used is typically from about 0.1 to about 5% by weight of the total amount of the monomer or monomers used.

The polymerization temperature is generally from 50° to 180° C., and preferably from 60° to 120° C. and the reaction time is preferably from about 1 to about 15 hours.

When the above-described polar solvents such as alcohols, ketones, ethers and esters are used together with the non-aqueous solvent in the reaction or when the unreacted monomer (A) or monomer (A) and monomer (B) or (C) remain without being used for the polymerizing granulation, it is preferred that the polar solvent or the unreacted monomer or monomers are distilled off by heating the reaction mixture to a temperature of higher than the boiling point of the polar solvent or the monomer(s) or are distilled off under reduced pressure.

The non-aqueous dispersion resin (or non-aqueous latex grains) prepared as described above exists as fine grains having a uniform grain size distribution and, at the same time, shows a very stable dispersibility. In particular, even when the liquid developer of the invention containing the non-aqueous dispersion resin grains (or the non-aqueous latex grains) is repeatedly used for a long period of time in a development apparatus, the dispersibility of the resin in the developer is well maintained. In addition, even when the developing speed is elevated, the re-dispersion of the resin in the liquid developer is easy, so that the resin grains do not stick to the parts of the apparatus under such high load conditions.

After fixing under heat, a strong film may be formed, and the dispersion resin has been found to have an excellent fixability.

Moreover, even when the liquid developer of the present invention is used in the process of an accelerated development-fixation step of using a master plate of a large size, the dispersion stability, the re-dispersibility and the fixability are excellent.

The liquid developer of the present invention may contain a colorant, if desired.

The colorant is not specifically limited, but any conventional pigments or dyes can be used as the colorant.

When the dispersion resin itself is to be colored, for example, a pigment or dye is physically dispersed in the dispersion resin as one method. Various kinds of pigments and dyes are known, which can be used in the method. Examples include magnetic iron oxide powder, lead iodide powder, carbon black, nigrosine, alkali blue, hansa yellow, quinacridone red, and phthalocyanine blue.

As another method of coloring the liquid developer, the dispersion resin may be dyed with a desired dye, for example, as disclosed in JP-A-57-48738. As still other methods, the dispersion resin may be chemically bonded to a dye, for example, as disclosed in JP-A-53-54029; or a previously dye-containing monomer is used in polymerizing granulation to obtain a dye-containing polymer, for example, as disclosed in JP-B44-22955. (The term "JP-B" as used herein means an "examined Japanese patent publication".)

Various additives may be added to the liquid developer of the present invention so as to enhance the charging characteristic or to improve the image-forming characteristic. For example, the substances described in Y. Harasaki, *Electrophotography*, Vol. 16, No. 2, page 44 can be used for such purpose.

Specifically, useful additives include metal salts of 2-ethylhexylsulfosuccinic acid, metal salts of naphthenic acid, metal salts of higher fatty acids, lecithin, poly(vinylpyrrolidone) and copolymers containing half-maleic acid amide component.

The amounts of the main constituting components of the liquid developer of the present invention are further explained below.

The amount of the toner grains consisting essentially of a resin and a colorant is preferably from about 0.5 to about 50 parts by weight per 1000 parts by weight of the liquid carrier. If it is less than about 0.5 part by weight, the image density would be insufficient. However, if it is more than about 50 parts by weight, the non-image area would thereby be fogged. In addition, the above-mentioned liquid carrier-soluble resin for enhancing the dispersion stability may also be used, if desired, and it may be added in an amount of from about 0.5 part by weight to about 100 parts by weight, to 1000 parts by weight of the liquid carrier. The above-mentioned charge-adjusting agent is preferably used in an amount of from about 0.001 to about 1.0 part by weight per 1000 parts by weight of the liquid carrier. In addition, various additives may also be added to the liquid developer of the present invention, if desired, and the upper limit of the total amount of the additives is to be defined in accordance with the electric resistance of the liquid developer. Specifically, if the electric resistance of the liquid developer, from which toner grains are removed, is lower than $10^9 \, \Omega$ cm, images with good continuous gradation could hardly be obtained. Accordingly, the amounts of the respective additives are required to be properly controlled within the abovedescribed limitation.

The following examples are intended to illustrate the embodiments of this invention in greater detail but not to limit the present invention in any way.

PRODUCTION EXAMPLE 1 OF DISPERSION STABILIZING RESIN

Production of P-1

A mixture of 100 g of octadecyl methacrylate, 2.0 g of divinylbenzene, 150 g of toluene, and 50 g of isopropanol was heated to 80° C. with stirring in a nitrogen gas stream and after adding thereto 5.0 g of 2,2'-azobis(-cyanovaleric acid) (A.C.V), the reaction was carried out for 8 hours. After cooling, the reaction mixture was re-precipitated in 2 liters of methanol to provide a white powder, which was collected by filtration and dried. A mixture of 50 g of the white powder thus obtained, 7.6 g of glycidyl methacrylate, 0.5 g of t-butylhydroquinone, 0.5 g of N,N-dimethyldodecylamine, and 100 g of toluene was heated to 100° C. and stirred for 20 hours. The reaction mixture was re-precipitated in 1 liter of methanol to provide a light yellow powder, which was collected by filtration and dried. The amount of the product was 43 g and the weight mean molecular weight thereof was $9.5 \times 10^4$.

PRODUCTION EXAMPLES 2 TO 10 OF DISPERSION STABILIZING RESIN

Production of P-2 to P-10

By following the same procedure as Production Example 1 described above except that each of the monomers shown in Table 1 below was used in place of octadecyl methacrylate, each of dispersion stabilizing resins P-2 to P-10 was produced. The weight mean molecular weights of the resins thus obtained were from $9.0 \times 10^4$ to $10.5 \times 10^4$.

TABLE 1

| Production Example | Resin* | Monomer | |
|---|---|---|---|
| 2 | P-2 | Dodecyl Methacrylate | 100 g |
| 3 | P-3 | Tridecyl Methacrylate | 100 g |
| 4 | P-4 | Octyl Methacrylate | 50 g |
|   |     | Dodecyl Methacrylate | 50 g |
| 5 | P-5 | Octadecyl Methacrylate | 80 g |
|   |     | Butyl Methacrylate | 20 g |
| 6 | P-6 | Dodecyl Methacrylate | 92 g |
|   |     | N,N-dimethylaminoethyl Methacrylate | 8 g |
| 7 | P-7 | Octadecyl Methacrylate | 95 g |
|   |     | 2-(Trimethoxysilyloxy)-ethyl Methacrylate | 5 g |
| 8 | P-8 | Hexadecyl Methacrylate | 100 g |
| 9 | P-9 | Tetradecyl Methacrylate | 100 g |
| 10 | P-10 | Docosanyl Methacrylate | 100 g |

*Dispersion Stabilizing Resin

PRODUCTION EXAMPLES 11 TO 23 OF DISPERSION STABILIZING RESIN

Production of P-11 to P-23

By following the same procedure as Production Example 1 except that each of the polyfunctional monomers and the oligomers shown in Table 2 below was used in place of divinylbenzene as a crosslinking polyfunctional monomer, each of dispersion stabilizing resins P-11 to P-23 was produced.

TABLE 2

| Production Example | Dispersion Stabilizing Resin | Crosslinking Monomer or Oligomer | Amount (g) | Weight Average Molecular Weight |
|---|---|---|---|---|
| 11 | P-11 | Ethylene Glycol Dimethacrylate | 2.5 | $10.5 \times 10^4$ |
| 12 | P-12 | Diethylene Glycol Dimethacrylate | 2.5 | $10 \times 10^4$ |
| 13 | P-13 | Vinyl Methacrylate | 5 | $9.8 \times 10^4$ |
| 14 | P-14 | Isopropenyl Methacrylate | 8 | $8.6 \times 10^4$ |
| 15 | P-15 | Divinyl Adipate | 10 | $8.8 \times 10^4$ |
| 16 | P-16 | Diallyl Glutaconate | 10 | $9.5 \times 10^4$ |
| 17 | P-17 | ISP-22GA (trade name, made by Okamura Seiyu K.K.) | 3.0 | $10 \times 10^4$ |
| 18 | P-18 | Triethylene Glycol Diacrylate | 1.0 | $9.3 \times 10^4$ |
| 19 | P-19 | Trivinylbenzene | 0.8 | $11.2 \times 10^4$ |
| 20 | P-20 | Polyethylene Glycol #400 Diacrylate | 3.0 | $9.6 \times 10^4$ |
| 21 | P-21 | Polyethylene Glycol Dimethacrylate | 3.5 | $10.5 \times 10^4$ |
| 22 | P-22 | Trimethylolpropane Triacrylate | 2.0 | $12 \times 10^4$ |

TABLE 2-continued

| Production Example | Dispersion Stabilizing Resin | Crosslinking Monomer or Oligomer | Amount (g) | Weight Average Molecular Weight |
|---|---|---|---|---|
| 23 | P-23 | Polyethylene Glycol #600 Diacrylate | 3.0 | $9.5 \times 10^4$ |

PRODUCTION EXAMPLE 24 OF DISPERSION STABILIZING RESIN capto compounds shown in Table 3 below was used in place of 3 g of thiomalic acid, each of dispersion stabilizing resins P-25 to P-30 was produced.

TABLE 3

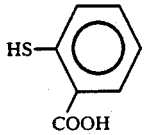

| Production Example | Dispersion Stabilizing Resin | Mercapto Compound | | Weight Average Molecular Weight |
|---|---|---|---|---|
| 25 | P-25 | $HSCH_2COOH$ | 2.5 g | $8.8 \times 10^4$ |
| 26 | P-26 | HS—⟨○⟩—COOH | 3.0 g | $9.5 \times 10^4$ |
| 27 | P-27 | $HSCH_2CH_2NH(CH_2)_2COOH$ | 3.5 g | $8.5 \times 10^4$ |
| 28 | P-28 | $HSCH_2CH_2NHCO(CH_2)_2COOH$ | 4.0 g | $9.0 \times 10^4$ |
| 29 | P-29 | $HSCH_2CH_2OOC(CH_2)_2COOH$ | 4.0 g | $9.5 \times 10^4$ |
| 30 | P-30 | $HSCH_2CH_2OOC-CH=CH-COOH$ | 4.0 g | $10 \times 10^4$ |

Production of P-24

A mixture of 100 g of octadecyl methacrylate, 3 g of thiomalic acid, 4.5 g of divinylbenzene, 150 g of toluene, and 50 g of ethanol was heated to 60° C. under a nitrogen gas stream and after adding thereto 0.5 g of 2,2'-azobis(isobutyronitrile) (A.I.B.N), the reaction was carried out for 5 hours. Furthermore, 0.3 g of A.I.B.N. was added to the reaction mixture and the reaction was further carried out for 3 hours and further 0.3 g of A.I.B.N. was added thereto, followed by reacting for 3 hours. After cooling, the reaction mixture was re-precipitated in 2 liters of methanol to provide a white powder, which was collected by filtration and dried. The amount of the product was 85 g.

Then, a mixture of 50 g of the powder thus obtained and 100 g of toluene was heated to 40° C. and stirred to dissolve the powder. Then, after adding thereto 0.2 g of t-butylhydroquinone, 8 g of vinyl acetate, and 0.03 g of mercury acetate, the reaction was carried out for 2 hours. Then, the temperature of the reaction mixture was raised to 70° C. and after adding thereto $1.2 \times 10^{-3}$ ml of 100% sulfuric acid, the reaction was carried out for 18 hours. After the reaction was over, 3.6 g of sodium acetate trihydrate was added to the reaction mixture followed by stirring for 30 minutes and after cooling, the reaction mixture was re-precipitated in 1.5 liters of methanol to provide 41 g of a slightly brownish powder. The weight average molecular weight of the powder was $10.5 \times 10^4$.

PRODUCTION EXAMPLES 25 TO 30 OF DISPERSION STABILIZING RESINS

Production of P-25 to P-30

By following the same procedure as Production Example 24 described above except that each of the mer-

PRODUCTION EXAMPLE 31 OF DISPERSION STABILIZING RESIN

Production of P-31

By following the same procedure as Production Example 24 except that a mixture of 100 g of dodecyl methacrylate, 4 g of ethylene glycol methacrylate, 4 g of thioglycolic acid 2,3-epoxypropyl ester, and 200 g of toluene was used in place of the mixture used in the example, the polymerization reaction was carried out.

Then, 6 g of crotonic acid, 1.0 g of 2,2'-methylenebis-(6-t-butyl-p-cresol), and 0.8 g of N,N-dimethyl-dodecylamine were added to the reaction mixture and the reaction was further carried out for 20 hours with stirring at 100° C. The reaction mixture obtained was re-precipitated in 2 liters of methanol and a light yellow viscous product obtained was collected by a decantation method and dried. The amount of the product was 75 g and the weight mean molecular weight thereof was $6.5 \times 10^4$.

PRODUCTION EXAMPLES 32 TO 40 OF DISPERSION STABILIZING RESINS

Production of P-32 to P-40

By following the same procedure as the Production Example 31 described above, except that each of the methacrylates and each of the carboxylic acid compounds having a polymerizable double bond group shown in Table 4 below were used in place of 100 g of dodecyl methacrylate and 6 g of crotonic acid, respectively, each of dispersion stabilizing resins P-32 to P-40 was produced.

The weight mean molecular weights of the resins thus obtained were from $6.0 \times 10^4$ to $7.5 \times 10^4$.

TABLE 4

| Production Example | Dispersion Stabilizing Resin | Methacrylate | | Carboxylic Acid | |
|---|---|---|---|---|---|
| 32 | P-32 | Octadecyl Methacrylate | 100 g | Crotonic Acid | 6 g |

TABLE 4-continued

| Production Example | Dispersion Stabilizing Resin | Methacrylate | | Carboxylic Acid | |
|---|---|---|---|---|---|
| 33 | P-33 | Dodecyl Methacrylate | 100 g | Methacrylic Acid | 6 g |
| 34 | P-34 | Hexadecyl Methacrylate | 100 g | Acrylic Acid | 5 g |
| 35 | P-35 | Octadecyl Methacrylate | 100 g | 4-Vinylbenzoic Acid | 7 g |
| 36 | P-36 | Dodecyl Methacrylate<br>2-Hydroxyethyl Methacrylate | 95 g<br>5 g | 4-Pentenoic Acid | 6 g |
| 37 | P-37 | Tridecyl Methacrylate<br>3-Chloropropyl Methacrylate | 95 g<br>5 g | 3-Butenic Acid | 5.5 g |
| 38 | P-38 | Dodecyl Methacrylate<br>2,4,6-Trifluorophenyl Methacrylate | 90 g<br>10 g | $CH_2=C(CH_3)COO(CH_2)_{10}COOH$ | 7 g |
| 39 | P-39 | Docosanyl Methacrylate | 100 g | $CH_2=C(CH_3)CONH(CH_2)_{10}COOH$ | 7.5 g |
| 40 | P-40 | Tetradecyl Methacrylate | 100 g | 3-Butenoic Acid | 5.8 g |

PRODUCTION EXAMPLE 41 OF DISPERSION STABILIZING RESIN

Production of P-41

A mixture of 100 g of tridecyl methacrylate, 1.2 g of divinylbenzene, and 200 g of tetrahydrofuran was heated to 70° C. with stirring under nitrogen gas stream and after adding thereto 6 g of 4,4'azobis(4-cyanopentanol), the reaction was carried out for 8 hours. Then, after cooling the reaction mixture, 6.2 g of methacrylic anhydride, 0.8 g of t-butylhydroquinone, and one drop of concentrated sulfuric acid were added thereto, and the mixture was stirred for one hour at 30° C. and further stirred for 3 hours at 50° C. After cooling, the reaction mixture thus obtained was reprecipitated in 2 liters of methanol and after removing the solution by decantation, a brownish viscous product thus formed was collected by filtration and dried. The amount of the product was 88 g and the weight average molecular weight thereof was $11.3 \times 10^4$.

PRODUCTION EXAMPLE 24 OF DISPERSION STABILIZING RESIN

Production of P-42

A mixture of 100 g of octadecyl methacrylate, 1.1 g of ethylene glycol diacrylate, and 200 g of tetrahydrofuran was heated to 70° C. with stirring under a nitrogen gas stream and after adding thereto 5 g of 4,4'-azobis(4-cyanopentanol), the reaction was carried out for 5 hours. Furthermore, 1.0 g of the aforesaid azobis compound was added to the reaction mixture and the reaction was further carried out for 5 hours. The reaction mixture thus formed was cooled to 20° C. in a water bath and after adding thereto 3.2 g of pyridine and 1.0 g of 2,2'-methylenebis-(6-t butyl-p-cresol), the resultant mixture was stirred. Then, to the mixture was added dropwise 4.2 g of methacrylic acid chloride over a period of 30 minutes in such a manner that the reaction temperature was not over 25° C. and the mixture obtained was stirred for 4 hours at temperature of from 20 to 25° C. Then, the reaction mixture was re-precipitated in a mixture of 1.5 liter of methanol and 0.5 liter of water to provide a white powder, which was collected by filtration and dried. The amount of the product was 82 g and the weight average molecular weight thereof was $11.2 \times 10^4$.

PRODUCTION EXAMPLES 43 TO 51 OF DISPERSION STABILIZING RESINS

Productions of P-43 to P-51

By following the same procedure as Production Example 42 except that each of the acid chlorides shown in Table 5 below was used in place of methacrylic acid chloride, each of dispersion stabilizing resins P-32 to P-51 was produced. The weight average molecular weights of the resins obtained were from $10 \times 10^4$ to $20 \times 10^4$.

TABLE 5

| Production Example | Dispersion Stabilizing Resis | Acid Chloride |
|---|---|---|
| 43 | P-43 | $CH_2=CH-COCl$ |
| 44 | P-44 | $CH_3-CH=CH-COCl$ |
| 45 | P-45 | $CH_2=CH-C_6H_4-COCl$ |
| 46 | P-46 | $CH_2=CH-COOCH_2CH_2COCl$ |
| 47 | P-47 | $CH_2=C(CH_3)-COO(CH_2)_2OCO(CH_2)_2COCl$ |
| 48 | P-48 | $CH_2=C(CH_3)-CONH(CH_2)_2COCl$ |
| 49 | P-49 | $CH_2=CH, COO(CH_2)_2OCO-C_6H_4-COCl$ |
| 50 | P-50 | $CH_2=C(CH_3)COOCH_2CHClCH_2OCO(CH_2)_3COCl$ |

TABLE 5-continued

| Production Example | Dispersion Stabilizing Resin | Acid Chloride |
|---|---|---|
| 51 | P-51 | CH$_2$=C(CH$_2$COOCH$_3$)(COCl) |

PRODUCTION EXAMPLE 52 OF DISPERSION STABILIZING RESIN

Production of P-52

A mixture of 100 g of dodecyl methacrylate, 0.8 g of ethylene glycol methacrylate, and 200 g of tetrahydrofuran was heated to 65° C. under nitrogen gas stream and after adding thereto 4 g of 2,2'-azobis(4-cyanovaleric acid chloride), the mixture was stirred for 10 hours. The reaction mixture obtained was cooled below 25° C. in a water bath and 2.4 g of allyl alcohol was added thereto. Then, 2.5 g of pyridine was added dropwise to the mixture in such a manner that the reaction temperature was not over 25° C. and the resulting mixture was stirred for one hour as it was. Furthermore, after stirring the mixture for 2 hours at 40° C., the reaction mixture was re-precipitated in 2 liters of methanol and a light yellow viscous product was obtained by decantation and dried. The amount of the product was 80 g and the weight average molecular weight thereof was $10.5 \times 10^4$.

PRODUCTION EXAMPLES 53 TO 61 OF DISPERSION STABILIZING RESINS

Production of P-53 to P-61

By following the same procedure as Production Example 24 described above except that each of the methacrylates and each of the polyfunctional monomers shown in Table 6 below were used in place of octedecyl methacrylate and divinylbenzene use in the example, respectively, each of dispersion stabilizing resins P-53 to P-61 was produced.

The weight average molecular weights of the resins thus obtained were from $9.0 \times 10^4$ to $12 \times 10^4$.

PRODUCTION EXAMPLE 1 OF LATEX GRAINS

Production of Latex Grain D 1

A mixture of 10 g of the dispersion stabilizing resin P-24, 100 g of vinyl acetate, and 384 g of Isopar H was heated to 70° C. with stirring under nitrogen gas stream and after adding thereto 0.8 g of 2,2'-azobis(isovaleronitrile) (A.I.V.N.), the reaction was carried out for 6 hours. Twenty minutes after the addition of the initiator, the solution became white turbid and the reaction temperature raised up to 88° C. Then, the temperature of the system was raised to 100° C. and the reaction mixture was stirred for 2 hours to distill off unreacted vinyl acetate. After cooling, the reaction mixture was passed through a nylon cloth of 200 mesh to provide a white dispersion which was a latex having a polymerization ratio of 90% and a mean grain size of 0.23 μm.

PRODUCTION EXAMPLES 2 TO 22 OF LATEX GRAINS

Production of Latex Grains D-2 to D-22

By following the same procedure as Production Example 1 of latex grains except that each of the dispersion stabilizing resins shown in Table 7 below was used in place of Resin P-24, each of the latex grains D2 to D-22 of this invention was produced.

The polymerization ratios of the grains were from 83 to 90% by weight.

TABLE 7

| Production Example Of Latex Grains | Latex Grains | Dispersion Stabilizing Resin | Mean Grain Size of Latex Grains (μm) |
|---|---|---|---|
| 2 | D-2 | P-25 | 0.23 |
| 3 | D-3 | P-26 | 0.22 |
| 4 | D-4 | P-27 | 0.20 |
| 5 | D-5 | P-28 | 0.23 |
| 6 | D-6 | P-29 | 0.20 |
| 7 | D-7 | P-30 | 0.21 |
| 8 | D-8 | P-31 | 0.18 |
| 9 | D-9 | P-32 | 0.17 |
| 10 | D-10 | P-35 | 0.25 |
| 11 | D-11 | P-36 | 0.19 |
| 12 | D-12 | P-37 | 0.22 |
| 13 | D-13 | P-40 | 0.23 |
| 14 | D-14 | O-44 | 0.17 |
| 15 | D-15 | P-45 | 0.25 |
| 16 | D-16 | P-51 | 0.28 |
| 17 | D-17 | P-52 | 0.19 |
| 18 | D-18 | P-53 | 0.20 |
| 19 | D-19 | P-55 | 0.20 |
| 20 | D-20 | P-58 | 0.19 |
| 21 | D-21 | P-60 | 0.16 |

TABLE 6

| Production Example | Dispersion Stabilizing Resin | Methacrylate | | Polyfunctional Monomer | |
|---|---|---|---|---|---|
| 53 | P-53 | Dodecyl Methacrylate | 100 g | Divinylbenzene | 4 g |
| 54 | P-54 | Tridecyl Methacrylate | 100 g | Divinylbenzene | 4 g |
| 55 | P-55 | Dodecyl Methacrylate | 100 g | Trivinylbenzene | 1.3 g |
| 56 | P-56 | Octadecyl Methacrylate | 100 g | Ethylene Glycol Dimethacrylate | 5 g |
| 57 | P-57 | Hexadecyl Methacrylate | 100 g | Propylene Glycol Dimethacrylate | 5 g |
| 58 | P-58 | Dodecyl Methacrylate / Butyl Methacrylate | 70 g / 30 g | Divinylbenzene | 4 g |
| 59 | P-59 | Octadecyl Methacrylate / Methyl Methacrylate | 90 g / 10 g | Ethylene Glycol Diacrylate | 4 g |
| 60 | P-60 | Tridecyl Methacrylate / 2-Chloroethyl Methacrylate | 94 g / 6 g | Trimethylolpropane Trimethacrylate | 1.5 g |
| 61 | P-61 | Tetradecyl Methacrylate / Styrene | 90 g / 10 g | Divinylbenzene | 4 g |

TABLE 7-continued

| Production Example Of Latex Grains | Latex Grains | Dispersion Stabilizing Resin | Mean Grain Size of Latex Grains (μm) |
|---|---|---|---|
| 22 | D-22 | P-61 | 0.26 |

PRODUCTION EXAMPLE 23 OF LATEX GRAINS

Production of Latex Grain D-23

A mixture of 8 g of the dispersion stabilizing resin P-1, 100 g of vinyl acetate, and 392 g of isododecane was heated to 70° C. with stirring under nitrogen gas stream and after adding thereto 0.9 g of benzoyl peroxide as a polymerization initiator, the reaction was carried out for 6 hours. 40 minutes after the addition of the polymerization initiator, the homogeneous solution began to become white-turbid, and the reaction temperature raised to 85° C. After cooling, the reaction mixture was passed through a 200 mesh nylon cloth to provide a latex having a mean grain size of 0.17 μm with a polymerization ratio of 88% as a white dispersion.

PRODUCTION EXAMPLE 24 OF LATEX GRAINS

Production of Latex Grain D-24

A mixture of 6 g of the dispersion stabilizing resin P-2, 10 g of poly(octadecyl methacrylate), 100 g of vinyl acetate, and 400 g of Isopar H was heated to 75° C. with stirring under nitrogen gas stream and after adding 0.7 g of A.I.B.N., the reaction was carried out for 4 hours. Then, 0.5 g of A.I.B.N. was further added to the reaction mixture, and the reaction was carried out for 2 hours. After cooling, the reaction mixture was passed through a 200 mesh nylon cloth to provide a latex having a mean grain size of 0.24 μm with a polymerization ratio of 85% as a white dispersion.

PRODUCTION EXAMPLE 25 OF LATEX GRAINS

Production of Latex Grain D-25

A mixture of 10 g of the dispersion stabilizing resin P-7 and 200 g of Isopar G was heated to 70° C. with stirring under nitrogen gas stream and after added dropwise thereto a mixture of 100 g of vinyl acetate, 180 g of Isopar G, and 1.0 g of A.I.V.N. over a period of 2 hours, the mixture was stirred for further 4 hours as it was. After cooling, the reaction mixture was passed through a 200 mesh nylon cloth to provide a latex having a mean grain size of 0.14 μm with a polymerization ratio of 85% as a white dispersion.

PRODUCTION EXAMPLE 26 OF LATEX GRAINS

Production of Latex Grain D-26

A mixture of 12 g of the dispersion stabilizing resin P-27, 90 g of vinyl acetate, 10 g of N-vinyl-pyrrolidone, and 400 g of isododecane was heated to 65° C. with stirring under nitrogen gas stream and after adding thereto 1.5 g of A.I.B.N., the reaction was carried out for 4 hours. After cooling, the reaction mixture obtained was passed through a 200 mesh nylon to provide a latex having a mean grain size of 0.25 μm with a polymerization ratio of 86% as a white dispersion.

PRODUCTION EXAMPLE 27 OF LATEX GRAINS

Production of Latex Grain D-27

A mixture of 12 g of the dispersion stabilizing resin P-25, 94 g of vinyl acetate, 5 g of 3-butenic acid, and 400 g of Isopar G was heated to 60° C. with stirring under nitrogen gas stream and after adding thereto 1.0 g of A.I.V.N., the reaction was carried out for 2 hours. Furthermore, 0.5 g of A.I.V.N. was added to the reaction mixture, and the reaction was further carried out for 2 hours. After cooling, the reaction product thus obtained was passed through a 200 mesh nylon cloth to provide a latex having a mean grain size of 0.20 μm with a polymerization ratio of 86% as a white dispersion.

PRODUCTION EXAMPLE 28 OF LATEX GRAINS

Production of Latex Grain D-28

A mixture of 20 g of the dispersion stabilizing resin P-1, 100 g of methyl methacrylate, and 500 g of Isopar H was heated to 60° C. with stirring under nitrogen gas stream and after adding thereto 0.7 g of A.I.V.N., the reaction was carried out for 4 hours. After cooling, the reaction mixture obtained was passed through a 200 mesh nylon cloth to provide a latex having a mean grain size of 0.30 μm with a polymerization ratio of 88% as a white dispersion.

PRODUCTION EXAMPLE 29 OF LATEX GRAINS

Production of Latex Grain D-29

A mixture of 20 g of the dispersion stabilizing resin P-35, 100 g of styrene, and 380 g of Isopar H was heated to 65° C. with stirring under nitrogen gas stream and after adding thereto 1.0 g of A.I.V.N., the reaction was performed for 4 hours. Then, 0.3 g of A.I.V.N. was further added to the reaction mixture, and the reaction was further carried out for 4 hours. After cooling, the reaction mixture obtained was passed through a 200 mesh nylon cloth to provide latex having a mean grain size of 0.28 μm with a polymerization ratio of 82% as a white dispersion.

PRODUCTION EXAMPLE 30 OF LATEX GRAINS (Comparison Example A)

By following the same procedure as Production Example 1 of latex grains except that a mixture of 20 g of poly(octadecyl methacrylate), 100 g of vinyl acetate, and 380 g of Isopar H was used, latex grains having a mean grain size of 0.23 μm with a polymerization ratio of 88% were obtained as a white dispersion.

PRODUCTION EXAMPLE 31 OF LATEX GRAINS (Comparison Example B)

A mixture of 18 g of octadecyl methacrylate, 2 g of acrylic acid, and 200 g of toluene was heated to 75° C. under nitrogen gas stream and after adding thereto 1.0 g of 2,2'-azobis(isobutyronitrile), the reaction was carried out for 8 hours.

Then, 6 g of glycidyl methacrylate, 1.0 g of t-butyrohydroquinone, and 1.2 g of N,N-dimethyldodecylamine were added to the reaction mixture and the resultant mixture was stirred for 40 hours at 100° C.

After cooling, the reaction mixture was re-precipitated to 2 liters of methanol to form a white powder, which was collected by filtration and dried. The amount of the product was 84 g and the weight average molecular weight thereof was 35,000.

Then, by following the same procedure as Production Example 1 of latex grains except that a mixture of 10 g of the resin, 100 g of vinyl acetate, and 390 g of Isopar H was used, latex grains having a mean grain size of 0.13 μm with a polymerization ratio of 89% were obtained as a white dispersion.

PRODUCTION EXAMPLE 32 OF LATEX GRAINS (Comparison Example C)

By following the same procedure as Production Example 1 of latex grains except that a mixture of 12 g of a dispersion stabilizing resin having a structure prepared by the method disclosed in JP-A-43757, 100 g of vinyl acetate, and 388 g of Isopar H was used, latex grains having a mean grain size of 0.18 μm with a polymerization ratio of 88% were obtained as a white dispersion.

Dispersion Stabilizing Resins:

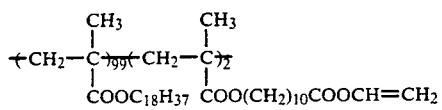

TABLE 8

| Production Example | Latex Grains | Dispersion Stabilizing Resin | Polymerization Ratio (%) | Mean Grain Size (μm) |
|---|---|---|---|---|
| 34 | D-34 | P-2 | 88 | 0.25 |
| 35 | D-35 | P 3 | 89 | 0.24 |
| 36 | D 36 | P-4 | 87 | 0.26 |
| 37 | D-37 | P-5 | 90 | 0.24 |
| 38 | D 38 | P-6 | 85 | 0.23 |
| 39 | D 39 | P-7 | 86 | 0.25 |
| 40 | D-40 | P-8 | 85 | 0.23 |
| 41 | D-41 | P-9 | 88 | 0.24 |
| 42 | D-42 | P-13 | 83 | 0.27 |
| 43 | D-43 | P-15 | 86 | 0.28 |
| 44 | D-44 | P-24 | 86 | 0.22 |

PRODUCTION EXAMPLES 45 TO 50 OF LATEX GRAINS

Production of Latex Grains D-45 to D-50

By following the same procedure as Production Example 1 of latex grains except that 1 g of each of the monomers shown in Table 9 below was used in place of 1 g of octadecyl methacrylate, each of the latex grains were producted.

TABLE 9

| Production Example of Latex Grains | Latex Grains | Monomer | Polymerization Ratio (%) | Mean Grain Size (μm) |
|---|---|---|---|---|
| 45 | D-45 | Docosanyl Methacrylate | 87 | 0.23 |
| 46 | D-46 | Hexadecyl Methacrylate | 87 | 0.24 |
| 47 | D-47 | Tetradecyl Methacrylate | 88 | 0.24 |
| 48 | D-48 | Tridecyl Methacrylate | 86 | 0.24 |
| 49 | D-49 | Dodecyl Methacrylate | 86 | 0.23 |
| 50 | D-50 | Decyl Methacrylate | 87 | 0.26 |

PRODUCTION EXAMPLE 33 OF LATEX GRAINS

Production of Latex Grain D-33

A mixture of 12 g of the dispersion stabilizing resin P-1, 100 g of vinyl acetate, 1.0 g of octadecyl methacrylate, and 384 g of Isopar H was heated to 70° C. with stirring under nitrogen gas stream and, after adding thereto 0.8 g of 2,2′-azobis(isovaleronitrile (A.I.V.N.), the reaction was carried out for 6 hours. Twenty minutes after the addition of the initiator, the solution became white-turbid, and the reaction temperature raised to 88° C. The temperature was raised to 100° C. and the reaction mixture was stirred for 2 hours to distill off unreacted vinyl acetate. After cooling, the reaction mixture was passed through a 200 mesh nylon cloth to provide a latex having a mean grain size of 0.24 μm with a polymerization ratio of 90% as a white dispersion.

PRODUCTION EXAMPLES 34 TO 44 OF LATEX GRAINS

Production of Latex Grains D-34 to D-44

By following the same procedure as Production Example 1 of latex grains except that each of the dispersion stabilizing resins shown in Table 8 below was used in place of the resin P-1, each of the latex grains D-34 to D-44 of this invention was produced.

PRODUCTION EXAMPLE 51 OF LATEX GRAINS

Production of Latex Grain D-51

A mixture of 6 g of the dispersion stabilizing resin P-10, 8 g, 100 g of vinyl acetate, 0.8 g of dodecyl methacrylate, and 400 g of Isopar H was heated to 75° C. with stirring under nitrogen gas stream and after adding thereto 0.7 g of 2,2′-azobis(isobutyronitrile) (A.I.B.N.), the reaction was carried out for 4 hours. Then, 0.5 g of A.I.B.N. was further added to the reaction mixture, and the reaction was carried out for 2 hours. After cooling, the reaction mixture was passed through a 200 mesh nylon cloth to provide a latex having a mean grain size of 0.17 μm as a white dispersion.

PRODUCTION EXAMPLE 52 OF LATEX GRAINS

Production of Latex Grain D-52

A mixture of 10 g of the dispersion stabilizing resin P-11, 90 g of vinyl acetate, 10 g of N-vinyl-pyrrolidone, 1.5 g of octadecyl methacrylate, and 400 g of isododecane was heated to 65° C. with stirring under nitrogen gas stream and, after adding thereto 1.5 g of A.I.B.N., the reaction was carried out for 4 hours. After cooling, the reaction mixture was passed through a 200 mesh nylon cloth to provide a latex having a mean grain size of 0.25 μm as a white dispersion.

PRODUCTION EXAMPLE 53 OF LATEX GRAINS

Production of Latex Grain D-53

A mixture of 20 g of the dispersion stabilizing resin P-1, 94 g of vinyl acetate, 6 g of crotonic acid, 2 g of hexadecyl methacrylate, and Isopar G was heated to 60° C. with stirring under nitrogen gas stream and after adding thereto 1.0 g of A.I.V.N., the reaction was carried out for 2 hours. Then, 0.5 g of A.I.V.N. was further added to the reaction mixture, and the reaction was carried out for 2 hours. After cooling, the reaction mixture was passed through a 200 mesh nylon cloth to provide a latex having a mean grain size of 0.28 μm as a white dispersion.

PRODUCTION EXAMPLE 54 OF LATEX GRAINS

Production of Latex Grain D-54

A mixture of 25 g of the dispersion stabilizing resin P-16, 100 g of methyl methacrylate, 2 g of decyl methacrylate, and Isopar H was heated to 60° C. with stirring under nitrogen gas stream and, after adding thereto 0.7 g of A.I.V.N., the reaction was carried out for 4 hours. After cooling, the reaction mixture was passed through a 200 mesh nylon cloth to provide a latex having a mean grain size of 0.38 μm as a white dispersion.

PRODUCTION EXAMPLE 55 OF LATEX GRAINS

Production of Latex Grain D-55

A mixture of 25 g of the dispersion stabilizing resin P-15, 100 g of styrene, 2 g of octadecyl vinyl ether, and 380 g of Isopar H was heated to 45° C. with stirring under nitrogen gas stream and, after adding thereto a hexane solution of n-butyllithium in an amount of 1.0 g as a solid content of n-butyllithium, the reaction was carried out for 4 hours. After cooling, the reaction mixture was passed through a 200 mesh nylon cloth to provide a latex having a mean grain size of 0.35 μm as a white dispersion.

PRODUCTION EXAMPLE 56 OF LATEX GRAINS (Comparison Example D)

By following the same procedure as Production Example 1 of latex grains except that a mixture of 20 g of poly(octadecyl methacrylate) [dispersion stabilizing resin (R)-1], 100 g of vinyl acetate, 1 g of octadecyl methacrylate, and 380 g of Isopar H was used, latex grains having a mean grain size of 0.27 μm with a polymerization ratio of 88% were obtained as a white dispersion.

PRODUCTION EXAMPLE 57 OF LATEX GRAINS (Comparison Example E)

A mixture of 97 g of octadecyl methacrylate, 3 g of acrylic acid, and 200 g of toluene was heated to 75° C. under nitrogen gas stream and after adding thereto 1.0 g of A.I.B.N., the reaction was carried out for 8 hours. Then, 12 g of glycidyl methacrylate, 1.0 g of t-butylhydroquinone, and 1.2 g of N,N-dimethyldodecylamine were added to the reaction mixture and the resultant mixture was stirred for 40 hours at 100° C. After cooling, the reaction mixture obtained was reprecipitated in 2 liters of methanol to form a white powder, which was collected by filtration and dried. Thus, a dispersion stabilizing resin (R)-2 having the following structure was obtained. The amount of the product was 84 g and the weight average molecular weight thereof was 35,000.

Dispersion Stabilizing Resin (R)-2:

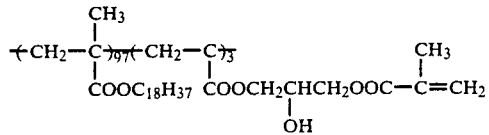

Then, by following the same procedure as Production Example 1 of latex grains except that a mixture of 10 g of the dispersion stabilizing resin (R)-2, 100 g of vinyl acetate, 1.0 g of octadecyl methacrylate, and 384 g of Isopar H was used, latex grains having a mean grain size of 0.15 μm with a polymerization ratio of 89% were obtained as a white dispersion.

PRODUCTION EXAMPLE 58 OF LATEX GRAINS (Comparison Example F)

By following the same procedure as Production Example 33 of latex grains except that a mixture of 12 g of a dispersion stabilizing resin (R)-3 (weight average molecular weight: 46,000) having the structure shown below prepared by the method described in JP-A-6163855, 100 g of vinyl acetate, 1.0 g of octadecyl methacrylate, and 382 g of Isopar H was used, latex grains having a mean grain size of 0.23 μm and a polymerization ratio of 87% were obtained as a white dispersion.

Dispersion Stabilizing Resin (R)-3:

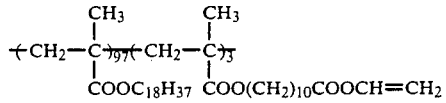

PRODUCTION EXAMPLE 59 OF LATEX GRAINS

Production of Latex Grain D-59

A mixture of 12 g of the dispersion stabilizing resin P-1, 100 g of vinyl acetate, 1.5 g of Compound III-19 of the monomer (B), and 384 g of Isopar H was heated to 70° C. with stirring under nitrogen gas stream and after adding thereto 0.8 g of A.I.V.N., the reaction was carried out. After 20 minutes since the addition of the initiator, the solution became white turbid and the reaction temperature raised to 88° C. Then, the temperature was raised to 100° C. and the mixture was stirred for 2 hours to distil off unreacted vinyl acetate. After cooling, the reaction mixture was passed through a 200 mesh nylon cloth to provide a latex having a mean grain size of 0.20 μm and a polymerization ratio of 86% as a white dispersion.

PRODUCTION EXAMPLES 60 TO 80 OF LATEX GRAINS

Production of Latex Grains D-60 to D-80

Each of latex grains D-60 to D-80 was produced by following the same procedure as Production Example 59 of latex grains, except that each of the dispersion stabilizing resins and each of the monomers (C) shown in Table 10 below were used in place of the dispersion establizing resin P-1 and the Compound III-19 of the monomer (B).

The polymerization ratios of the resulting latex grains were from 85% to 90%.

TABLE 10

| Production Example Of Latex Grains | Latex Grains | Dispersion Stabilizing Resin | Monomer (C) | Mean Grain Size of Latex Grains (μm) |
|---|---|---|---|---|
| 60 | D-60 | P-1 | III-1 | 0.19 |
| 61 | D-61 | " | III-2 | 0.19 |
| 62 | D-62 | " | III-3 | 0.20 |
| 63 | D-63 | " | III-8 | 0.22 |
| 64 | D-64 | " | III-9 | 0.22 |
| 65 | D-65 | " | III-10 | 0.20 |
| 66 | D-66 | " | III-11 | 0.18 |
| 67 | D-67 | " | III-14 | 0.17 |
| 68 | D-68 | " | III-18 | 0.21 |
| 69 | D-69 | P-2 | III-10 | 0.19 |
| 70 | D-70 | P-3 | III-19 | 0.20 |
| 71 | D-71 | P-4 | III-20 | 0.22 |
| 72 | D-72 | P-5 | III-21 | 0.22 |
| 73 | D-73 | P-6 | III-22 | 0.23 |
| 74 | D-74 | P-12 | III-23 | 0.23 |
| 75 | D-75 | P-14 | III-24 | 0.22 |
| 76 | D-76 | P-16 | III-15 | 0.23 |
| 77 | D-77 | P-18 | III-16 | 0.18 |
| 78 | D-78 | P-23 | III-26 | 0.19 |
| 79 | D-79 | P-24 | III-27 | 0.20 |
| 80 | D-80 | P-26 | III-29 | 0.21 |

PRODUCTION EXAMPLE 81 OF LATEX GRAINS

Production of Latex Grain D 81

A mixture of 8 g (as solid content) of the resin P-25 obtained by Production Example 25 of dispersion stabilizing resin, 7 g of poly(dodecyl methacrylate), 100 g of vinyl acetate, 1.5 g of Compound III-15 of the monomer (C), and 380 g of n-decane was heated to 75° C. with stirring under nitrogen gas stream and, after adding thereto 1.0 g of A.I.B.N., the reaction was carried out for 4 hours. Then, 0.5 g of A.I.B.N. was further added to the reaction mixture and the reaction was further carried out for 2 hours. Then, the temperature of the system was raised to 110° C., and the mixture was stirred for 2 hours to distil off the low boiling solvent and residual vinyl acetate. After cooling, the reaction mixture was passed through a 200 mesh nylon cloth to provide a latex having a mean grain size of 0.20 μm as a white dispersion.

PRODUCTION EXAMPLE 82 OF LATEX GRAINS

Production of Latex Grain D-82

A mixture of 14 g of the resin P-1 obtained by Production Example 1 of dispersion stabilizing resin, 85 g of vinyl acetate, 2.0 g of Compound III-23 of the monomer (C), 15 g of N-vinylpyrrolidone, and 400 g of isododecane was heated to 65° C. with stirring under nitrogen gas stream and, after adding thereto 1.5 g of A.I.B.N., the reaction was carried out for 4 hours. After cooling, the reaction mixture was passed through a 200 mesh nylon cloth to provide a latex having a mean grain size of 0.26 μm as a white dispersion.

PRODUCTION EXAMPLE 83 OF LATEX GRAINS

Production of Latex Grain D-83

A mixture of 12 g of the resin P-5 obtained by Production Example 5 of dispersion stabilizing resin, 100 g of vinyl acetate, 1.5 g of Compound III 18 of the monomer (C), 5 g of 4-pentenoic acid, and 383 g of Isopar G was heated to 60° C. with stirring under nitrogen gas stream. After adding thereto 1.0 g of A.I.V.N., the reaction was carried out for 2 hours. Then, 0.5 g of A.I.V.N. was further added to the reaction mixture, and the reaction was further carried out for 2 hours. After cooling, the reaction mixture was passed through a 200 mesh nylon cloth to provide a latex having a mean grain size of 0.25 μm as a white dispersion.

PRODUCTION EXAMPLE 84 OF LATEX GRAINS

Production of Latex Grain D-84

A mixture of 20 g of the resin P-20 obtained by Production Example 20 of dispersion stabilizing resin, 2 g of Compound III-16 of the monomer (C), 100 g of methyl methacrylate, and 478 g of Isopar H was heated to 65° C. with stirring under nitrogen gas stream and, after adding thereto 1.2 g of A.I.V.N., the reaction was carried out for 4 hours. After cooling, the reaction mixture was passed through a 200 mesh nylon cloth to remove coarse grains and to provide a latex having a mean grain size of 0.36 μm as a white dispersion.

PRODUCTION EXAMPLE 85 OF LATEX GRAINS

Production of Latex Grain D 85

A mixture of 18 g of the resin P-21 obtained by Production Example 21 of dispersion stabilizing resin, 100 g of styrene, 4 g of Compound III-22 of the monomer (C), and 380 g of Isopar 380 was heated to 50° C. with stirring under nitrogen gas stream and, after adding thereto 1.0 g of a hexane solution of n-butyllithium as solid content, the reaction was carried out for 4 hours. After cooling, the reaction mixture was passed through a 200 mesh nylon cloth to provide latex having a mean grain size of 0.30 μm as a white dispersion.

PRODUCTION EXAMPLE 86 OF LATEX GRAINS (Comparison Example G)

By following the same procedure as Production Example 1 of latex grains, except that a mixture of 20 g of poly(octadecyl methacrylate) (weight average molecular weight: 35,000), 100 g of vinyl acetate, 1.5 g of Compound III-19 of the monomer (C), and 380 g of Isopar H was used, a latex having a mean grain size of 0.23 μm with a polymerization ratio of 88% was obtained as a white dispersion.

PRODUCTION EXAMPLE 87 OF LATEX GRAINS (Comparison Example H)

By following the same procedure as Production Example 59 of latex grains, except that a mixture of 14 g of a dispersion stabilizing resin having the structure shown below, 100 g of vinyl acetate, 1.5 g of Compound III-19 of the monomer (C), and 386 g of Isopar H was used, latex grains having a mean grain size of 0.25 μm with a polymerization ratio of 90% were obtained as a white dispersion.

Dispersion Stabilizing Resin:

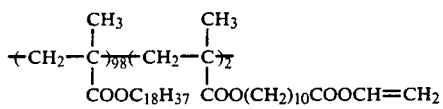

Weight average molecular weight: 43,000

EXAMPLE 1

In a paint shaker (manufactured by Tokyo Seiki K.K.) were placed 10 g of a dodecyl methacrylate/acrylic acid copolymer (95/5 by weight ratio), 10 g of nigrosin, and 30 g of Isopar G together with glass beads, and the mixture was dispersed for 4 hours to provide a fine dispersion of nigrosin.

Then, by diluting 30 g of the resin dispersion obtained in aforesaid Production Example 1 of latex grains, 2.5 g of the aforesaid nigrosin dispersion, 0.07 g of an octadecene/semimaleic acid octadecylamide copolymer, and 15 g of higher alcohol FOC-1400 (made by Nissan Chemical Industries, Ltd.) with 1 liter of Isopar G, a liquid developer for electrostatic photography was obtained.

Comparison Developers a to c

By following the same procedure as the aforesaid production of liquid developer except that each of the following resin dispersions was used in place of the above-described resin dispersion, three kinds of comparison liquid developers a, b, and c were prepared.

Comparison Liquid Developer a

The resin dispersion in Production Example 30 of latex grains.

Comparison Liquid Developer b

The resin dispersion in Production Example 31 of latex grains.

Comparison Liquid Developer c

The resin dispersion in Production Example 32 of latex grains.

An electrophotographic light-sensitive material, ELP Master II Type (made by Fuji Photo Film Co., Ltd.) was image-exposed and developed by a full-automatic processor ELP 404V (made by Fuji Photo Film Co., Ltd.) using each of the aforesaid liquid developers. The processing speed was 7 plates/minute. Furthermore, 2,000 plates of ELP Master II Type were processed, whereupon the degree of stains by the adhesion of the toner to parts of the developing apparatus was observed. The blackened ratio (imaged area) of each duplicated image was determined using 30% original. The results are shown in Table 11 below.

TABLE 11

| Test No. | Developer | Stains of Developing Apparatus | Image of 2000th Plate |
|---|---|---|---|
| 1 | Developer of the Invention | No toner adhered | Clear Image |
| 2 | Developer a | Toner residue greatly adhered | Letter parts lost Background area stained and fogged |
| 3 | Developer b | Toner residue adhered a little | Density of solid black portion of image lowered |
| 4 | Developer c | Toner residue adhered a little | Clear image |

Test No.1: Example 1 of this invention
Test Nos. 2 to 4: Comparison Examples a, b, and c.

As is clear from the results shown in Table 11, when each plate (printing plate) was made using each liquid developer under the very fast processing speed as described above, only when the liquid developer of this invention was used, the developing apparatus was not stained by the developer and the images of the 2000th plate were clear.

Then, when each printing master plate (ELP Master) prepared by processing using each of the aforementioned liquid developers was used for printing in a conventional manner and the number of prints obtained before the occurrences of letter failures and the blurs of the solid black portion of the images of each print obtained was determined, each of the master plates obtained using the liquid developer of this invention and the liquid developers a, b, and c in Comparison Examples a, b, and c could give more than 10,000 prints without the occurrences of the aforesaid troubles.

As shown in the results described above, only the liquid developer using the resin grains in this invention caused no stains of the developing apparatus and could give a large number of good prints by the master plate.

In other words, in the case of the Comparison Examples a, b, and c, there was no problem on the number of prints obtained by the developing apparatus was too stained to further use continuously.

The occurrence of stains of the developing apparatus was greatly reduced in Comparison Examples b and c compared with the case of Comparison Example a but when the development condition became severe, the cases of Comparison Examples b and c were not yet satisfactory.

That is, it is considered that the known dispersion stabilizing resin in Comparison Example b has the chemical structure that the component having a polymerization double bond copolymerizing with the monomer (A) (vinyl acetate in the comparison example) being contained in the polymer is randomly copolymerized with the aforesaid monomer in the polymer, whereby the dispersion stabilizing resin is inferior in the re-dispersibility of latex grains to the dispersion stabilizing resin in this invention.

Also, the known dispersion stabilizing resin in Comparison Example c has the chemical structure that the total sum of the atoms of the linkage group linking the polymerizable double bond group in the resin being copolymerized with the monomer (A) to the polymer main chain portion of the resin is at least 9 and further the structure of the polymerizable double bond group in Comparison Example c is $CH_2=CH-OCO-$, while the structure of the polymerizable double bond group in Comparison Example b is

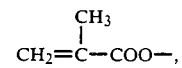

and hence the former structure has preferably a good reactivity with vinyl acetate (Monomer (A)). Thus, in Comparison Example c, the images of the 2,000th plate are clear and are greatly improved as compared with the case of Comparison Example b. However, when the development condition becomes severe, the occurrence of stains of the developing apparatus is yet also unsatisfactory in Comparison Example c.

EXAMPLE 2

A mixture of 100 g of the white resin dispersion (latex grains) obtained in Production Example 2 of latex grains and 1.5 g of Sumikalon Black was heated to 100° C. with stirring for 4 hours. After cooling to room temperature, the reaction mixture was passed through a 200 mesh nylon cloth to remove the remaining dye, thereby a black resin dispersion having a mean grain size of 0.23 μm was obtained.

By diluting 30 g of the black resin dispersion thus obtained and 0.05 g of zirconium naphthenate with one liter of Shellsol 71, a liquid developer was prepared.

When the liquid developer was applied to the same developing apparatus as in Example 1, no stains of the developing apparatus by adhering of the toner were found after developing 2,000 plates.

The image quality of the offset printing plate master plate thus obtained was clear and the image quality of the 10,000th print was very clear.

EXAMPLE 3

A mixture of 100 g of the white resin dispersion (latex grains) obtained in Production Example 27 of latex grains and 3 g of Victoria Blue was heated to a temperature of from 70° C. to 80° C. with stirring for 6 hours. After cooling to room temperature, the reaction mixture was passed through a 200 mesh nylon cloth to remove the remaining dye, thereby a blue resin dispersion having a mean grain size of 0.21 μm was obtained.

By diluting 32 g of the aforesaid blue resin dispersion and 0.05 g of zirconium naphthenate with one liter of Isopar H, a liquid developer was prepared.

When the liquid developer was applied to the same developing apparatus as in Example 1, no stains of the developing apparatus by adhering of the toner were found even after developing 2,000 plates. Also, the image quality of the offset printing master plate obtained was clear and also the image quality of the 10,000th print obtained was very clear.

EXAMPLE 4

By diluting 32 g of the white resin dispersion (latex grains) obtained in Production Example 11 of latex grains, 2.5 g of the nigrosin dispersion prepared as in Example 1, 0.02 g of a semi-docosanylamidated product of a copolymer of octadecyl vinyl ether and maleic anhydride, and 10 g of a higher alcohol, FOC-1600 (trade name, made by Nissan chemical Industries, Ltd.) with one liter of Isopar G, a liquid developer was prepared.

When the liquid developer was applied to the same developing apparatus as in Example 1, no occurrence of stains of the developing apparatus by adhering of the toner was observed even after the development of 2,000 plates. Also, the image quality of the offset printing master plate obtained and the image quality of the 10,000th print formed using the master plate were very clear.

Furthermore, when the same processing as above was performed after allowing to stand the liquid developer for 3 months, the same results as above were obtained.

EXAMPLE 5

In a paint shaker were placed 10 g of poly(decyl methacrylate), 30 g of Isopar H, and 8 g of Alkali Blue together with glass beads and the mixture was dispersed for 2 hours to provide a fine dispersion of Alkali Blue.

Then, by diluting 30 g of the white resin dispersion (latex grains) obtained in Production Example of latex grains, 4.2 g of the aforementioned Alkali Blue dispersion, 15 g of a higher alcohol, FOC-1400 (trade name, made by Nissan Chemical Industries), and 0.06 g of a semi-docosanylamidated product of a copolymer of 1-tetradecene and maleic anhydride with one liter of Isopar G, a liquid developer was prepared.

When the liquid developer was applied to the same developing apparatus as in Example 1, no occurrence of stains of the developing apparatus by adhering of the toner was observed. Also, the image quality of the offset printing master plate thus obtained and the image quality of the 10,000th print were very clear.

EXAMPLES 6 TO 29

By following the same procedure as Example 5 except that each of the latex grains shown in Table 12 below was used in an amount of 6.0 g as solid content in place of the white resin dispersion in Production Example 1 of latex grains, each of liquid developers was prepared. The results of using each liquid developer for the developing apparatus as in Example 1 are also shown in Table 12.

TABLE 12

| Example | Latex Grains | Stains of Developing Apparatus | Image of the 2000th Plate |
|---|---|---|---|
| 6 | D-2 | No stain occurred | Clear |
| 7 | D-3 | No stain occurred | " |
| 8 | D-3 | No stain occurred | " |
| 9 | D-4 | No stain occurred | " |
| 10 | D-5 | No stain occurred | " |
| 11 | D-7 | No stain occurred | " |
| 12 | D-8 | No stain occurred | " |
| 13 | D-9 | No stain occurred | " |
| 14 | D-10 | No stain occurred | " |
| 15 | D-11 | No stain occurred | " |
| 16 | D-12 | No stain occurred | " |
| 17 | D-13 | No stain occurred | Clear |
| 18 | D-14 | No stain occurred | " |
| 19 | D-15 | No stain occurred | " |
| 20 | D-16 | No stain occurred | " |
| 21 | D-17 | No stain occurred | " |
| 22 | D-18 | No stain occurred | " |
| 23 | D-19 | No stain occurred | " |
| 24 | D-20 | No stain occurred | " |
| 25 | D-21 | No stain occurred | " |
| 26 | D-22 | No stain | " |

TABLE 12-continued

| Example | Latex Grains | Stains of Developing Apparatus | Image of the 2000th Plate |
|---|---|---|---|
| 27 | D-23 | occurred No stain occurred | " |
| 28 | D-24 | No stain occurred | " |
| 29 | D-25 | No stain occurred | " |

As described above, when each developer was applied to the same developing apparatus as in Example 1, no occurrence of stains of the developing apparatus by adhering the toner was observed. Also, the image quality of the offset printing plates obtained and the image quality of the 10,000th print formed using each of the master plates were very clean.

EXAMPLE 30

In a paint shaker (manufactured by Tokyo Seiki K.K.) were placed 10 g of a dodecyl methacrylate/acrylic acid copolymer (95/5 by weight ratio), 10 g of nigrosine and 30 g of Isopar G together with glass beads and they were dispersed for 4 hours to provide a fine dispersion of nigrosine.

Then, by diluting 30 g of the resin dispersion (latex grains) of Production Example 33 of latex grains, 2.5 g of the aforesaid nigrosine dispersion, and 0.07 g of a copolymer of octadecene and maleic semioctadecylamide with one liter of Isopar G, a liquid developer was prepared.

Comparison Liquid Developers d, e, and f

By following the aforesaid procedure using each of the resin grains shown below in place of the resin dispersion in the above-described example, three kinds of Comparison Liquid Developers d, e, and f were prepared.

Comparison Liquid Developer d

The resin dispersion obtained in Production Example 58 of latex grains was used.

Comparison Liquid Developer e

The resin dispersion obtained in Production Example 59 of latex grains was used.

Comparison Liquid Developer f

The resin dispersion obtained in Production Example 60 was used.

An electrophotographic light-sensitive material, ELP Master II Type (made by Fuji Photo Film Co., Ltd.) was image exposed and developed by a full-automatic processor, ELP 404V (made by Fuji Photo Film Co., Ltd.) using each of the aforementioned liquid developers. The processing (plate-making) speed was 7 plates/min. Furthermore, 2,000 plates of ELP Master II Type were processed, whereupon the degree of stains by the adhesion of the toner to parts of the developing apparatus was observed. The blackened ratio (imaged area) of each duplicated image was determined using 40% original. The results are shown in Table 13.

TABLE 13

| Test No. | Developer | Stains of Developing Apparatus | Image of the 2000th Plate |
|---|---|---|---|
| 1 | Developer of the Invention | No toner adhered | Clear |
| 2 | Developer d | Toner residue greatly adhered | Letter parts lost, Density of solid black portion lowered, Background area fogged |
| 3 | Developer e | Toner Residue adhered a little | Density of solid black portion of image lowered, Density of letter portion lowered |
| 4 | Developer f | Toner residue adhered slightly | Density of solid black portion of image lowered |

Test No. 1: Example 30 of the invention.
Test Nos. 2, 3, and 4: Comparison developers d, e, and f.

When printing plates were made using each of the liquid developers under the aforesaid processing (plate making) conditions, only the liquid developer of this invention gave no stains of the developing apparatus and gave clear image of the 2000th plate as is clear from Table 13 above.

Then, each printing master plate (ELP Master) prepared by processing with each of the aforesaid liquid developers was used for printing in a conventional manner, and the number of prints obtained before the occurrences of letter failures and the blurs of the solid black portion of the images of each print obtained were compared. As a result, each of the master plates obtained using the liquid developer of this invention and the liquid developers d, e, and f in Comparison Examples d, e, and f could give more than 10,000 prints without the occurrences of the aforesaid troubles.

As shown in the results described above, only the liquid developer using the resin grains of this invention cased no stains of the developing apparatus and could give a large number of good prints by the master plate.

In other words, in the cases of Comparison Examples d, e, and f, there was no problem on the number of prints obtained but the developing apparatus was too stained to further use as it was.

The occurrence of stains of the developing apparatus was greatly reduced in the cases of Comparison Examples e and f as compared with the case of Comparison Example d but the development condition became severe, the cases of Comparison Examples e and f were not yet satisfactory.

That is, it is considered that the known dispersion stabilizing resins in Comparison Examples e and f have the chemical structure that the component having a polymerizable double bond group copolymerizing with the monomer (A) (vinyl acetate in the example) being contained in the polymer is randomly copolymerized with the monomer, thereby these dispersion stabilizing resins are inferior in the re dispersibility of latex grains to the dispersion stabilizing resin of this invention.

EXAMPLE 31

A mixture of 100 g of the white resin dispersion (latex grains) obtained in Production Example 34 of latex grains and 1.5 g of Simikalon Black was heated to 100° C. with stirring for 4 hours. After cooling to room temperature, the reaction mixture was passed through a 200 mesh nylon cloth to remove the remaining dye, thereby a black resin dispersion having a mean grain size of 0.20 μm was obtained.

By diluting 32 g of the aforesaid black resin dispersion and 0.05 g of zirconium naphthenate with one liter of Shellsol 71, a liquid developer was prepared.

When the liquid developer was applied to the same developing apparatus as in Example 30, no occurrence of stains of the developing apparatus by adhering the toner was observed even after developing 2,000 plates.

Also, the image quality of the offset printing master plate obtained was clear and also the image quality of the 10,000th print formed by using the master plate was very clear.

EXAMPLE 32

A mixture of 100 g of the white resin dispersion (latex grains) obtained in Production Example 53 of latex grains and 3 g of Victoria Blue B was heated to a temperature of from 70 to 80° C. with stirring for 6 hours. After cooling to room temperature, the reaction mixture was passed through a 200 mesh nylon to remove the remaining dye, thereby a blue resin dispersion having a mean grain size of 0.35 μm was obtained.

By diluting 32 g of the aforesaid blue resin dispersion and 0.05 g of zirconium naphthenate with one liter of Isopar H, a liquid developer was prepared.

When the liquid developer was applied to the same developing apparatus as in Example 30, no occurrence of stains of the developing apparatus was observed even after developing 2,000 plates. Also, the image quality of the offset printing master plate obtained was clear and the image quality of the 10,000th print formed by using the master plate was very clear.

EXAMPLE 33

By diluting 32 g of the white resin dispersion (latex grains) obtained in Production Example 44 of latex grains, 2.5 g of the nigrosine dispersion obtained in Example 30, and 0.02 g of a semi-docosanylamidated product of a copolymer of diisobutyrene and maleic anhydride with one liter of Isopar G, a liquid developer was prepared.

When the liquid developer was applied to the same developing apparatus as in Example 30, no occurrence of stains of the developing apparatus by adhering the toner was observed. Also, the image quality of the offset printing master plate obtained and the image quality of the 10,000th print formed using the master plate were clear.

Furthermore, the liquid developer was allowed to stand for 3 months and applied to the aforesaid processing, the results were completely same as above.

EXAMPLE 34

In a paint shaker were placed 10 g of poly(decyl methacrylate), 30 g of Isopar H, and 8 g of Alkali Blue together with glass beads followed by dispersing for 2 hours to provide a fine dispersion of Alkali Blue.

Then, by diluting 30 g of the white resin dispersion (latex grains) obtained in Production Example 33 of latex grains, 4.2 g of the aforesaid dispersion of Alkali Blue, 15 g of a high alcohol, FOC-1400 (trade name, made by Nissan chemical Industries. Ltd.), and 0.06 g of a semi-docosanylamidated product of a copolymer of diisobutyrene and maleic anhydride with one liter of Isopar G, a liquid developer was prepared.*****

When the liquid developer was applied to the same developing apparatus as in Example 30, no occurrence of stains of the developing apparatus by adhering the toner was observed. Also, the image quality of the offset printing master plate obtained and the image quality of the 10,000th print obtained using the master plate were very clear.

EXAMPLES 35 TO 50

By following the same procedure as Example 34 except that each of the latex grains shown in Table 14 below was used in an amount of 6.0 g as solid content in place of the white resin dispersion in Production Example 33 of latex grains, each of the following liquid developers was prepared.

TABLE 14

| Example | Latex Grains | Stains of Developing Apparatus | Image of the 2000th Plate |
|---|---|---|---|
| 35 | D-36 | No stain occurred | Clear |
| 36 | D-37 | " | " |
| 37 | D-38 | " | " |
| 38 | D-39 | " | " |
| 39 | D-40 | " | " |
| 40 | D-42 | " | " |
| 41 | D-43 | " | " |
| 42 | D-44 | " | " |
| 43 | D-45 | " | " |
| 44 | D-46 | " | " |
| 45 | D-47 | " | " |
| 46 | D-48 | " | " |
| 47 | D-49 | " | " |
| 48 | D-50 | " | " |
| 49 | D-51 | " | " |
| 50 | D-52 | " | " |

When each of the liquid developers obtained was applied to the same developing apparatus as in Example 30, no occurrence of stains on the developing apparatus was observed even after developing 2,000 plates. Also, the image quality of the offset printing master plate obtained and the image quality of the 10,000th print obtained using the master plate were very clear.

EXAMPLE 51 AND COMPARISON EXAMPLES q AND h

In a paint shaker (manufactured by Tokyo Seiki K.K.) were placed 10 g of a dodecyl methacrylate/acrylic acid copolymer (95/5 by weight ratio), 10 g of nigrosine and 71 g of Shellsol 71 together with glass beads and they were dispersed for 4 hours to provide a fine dispersion of nigrosine.

Then, by diluting 30 g of the resin dispersion D-59 obtained in Production Example 59 of latex grains, 2.5 g of the aforesaid nigrosine dispersion, 0.08 g of a copolymer of octadecene and maleic semi-octadecylamide, and 15 g of a higher alcohol, FOC-1400 (trade name, made by Nissan Chemical Industries, Ltd.) with one liter of Shellsol 71, a liquid developer was prepared.

Comparison Liquid Developers g and h

Comparison liquid developers g and h were prepared using each of the following resin dispersions in place of the resin dispersion D-59 in the aforesaid production example of the liquid developer of this invention.

Comparison Liquid Developers g

The resin dispersion in Production Example 86 of latex grains.

Comparison Liquid Developers h

The resin dispersion in Production Example 87 of latex grains.

An electrophotographic light-sensitive material, ELP Master II Type (made by Fuji Photo Film Co., Ltd.) was image-exposed and developed by a full-automatic processor ELP 404V (made by Fuji Photo Film Co., Ltd.) using each of the aforesaid liquid developers. The processing speed was 7 plates/min. Furthermore, 2,000 plates of ELP master II type were processed, whereupon the degree of stains by the adhesion of the toner to parts of the developing apparatus was observed. The blackened ratio (imaged area) of each duplicated image was determined using 30% original. The results are shown in Table 15 below.

TABLE 15

| Test No. | Developer | Stains of Developing Apparatus | Image of the 2000th Plate |
|---|---|---|---|
| 1 | Developer of Example 51 | No toner adhered | Clear |
| 2 | Developer g | Toner residue greatly adhered | Letter parts lost, Density of solid black portion lowered, Background area fogged |
| 3 | Developer h | Toner Residue adhered slightly | $D_{max}$ of solid black portion lowered, Density of fine lines slightly lowered. |

When printing plates were made using each of the liquid developers under aforesaid processing (plate-making) condition, only the liquid developer of this invention gave no stains of the developing apparatus and gave clear images of the 2,000th plate as is clear from the results shown in Table 15.

Then, when each offset printing master plate (ELP master) prepared by processing using each of the aforesaid liquid developers was used for printing in a conventional manner and the number of prints obtained before the occurrences of letter failures and the blurs of the solid black portion of the images of each print obtained was determined, each of the master plates obtained using the liquid developer of this invention and the comparison liquid developers g and h could give more than 10,000 prints without causing the aforesaid troubles.

As shown in the results described above, only the liquid developer using the resin grains in this invention caused no stains of the developing apparatus and could give a large number of good prints by the master plate.

In other words, in the cases of Comparison Examples g and h, there was no problem in the number of prints obtained but the developing apparatus was too stained to further use as it was.

These results clearly show that the resin grains of this invention are excellent.

EXAMPLE 52

A mixture of 100 g of the white resin dispersion (latex grains) obtained in Production Example 60 of latex grains and 1.5 g of Sumikalon Black was heated to 00° C. with stirring for 4 hours. After cooling to room temperature, the reaction mixture was passed through a 200 mesh nylon cloth to remove the remaining dye, thereby a black resin dispersion having a mean grain size of 0.20 μm was obtained.

Then, by diluting 32 g of the aforesaid black resin dispersion and 0.05 g of zirconium naphthenate with one liter of Shellsol 71, a liquid developer was prepared.

When the liquid developer was applied to the same developing apparatus as in Example 51, no occurrence of stains of the developing apparatus was observed even after developing 2,000 plates.

Also, the image quality of the offset printing master plate obtained was clear and the image quality of the 10,000th print was very clear.

EXAMPLE 53

A mixture of 100 g of the white resin dispersion D-25 obtained in Production Example 83 and 3 g of Victoria Blue B was heated to a temperature of from 70 to 80° C. with stirring for 6 hours. After cooling to room temperature, the reaction mixture was passed through a 200 mesh nylon cloth to remove the remaining dye, thereby a blue resin dispersion having a mean grain size of 0.26 μm was obtained.

Then, by diluting 32 g of the aforesaid blue resin dispersion and 0.05 g of zirconium naphthenate with one liter of Isopar H, a liquid developer was prepared.

When the liquid developer was applied to the developing apparatus as in Example 51, no occurrence of stains of the developing apparatus by adhering the toner was observed even after developing 2,000 plates. Also, the image quality of the offset printing master plate obtained was clear and the image quality of the 10,000th print obtained using the master plate was very clear.

EXAMPLE 54

By diluting 32 g of the white resin dispersion D-2 obtained in Production Example 60 of latex grains, 2.5 g of the nigrosine dispersion obtained in Example 5, and 0.02 g of a semi-docosanylamidated product of a copolymer of octadecyl vinyl ether and maleic anhydride with one liter of Isopar G, a liquid developer was prepared.

When the liquid developer was applied to the developing apparatus as in Example 51, no occurrence of stains of the developing apparatus by adhering the toner was observed even after developing 2,000 plates. Also, the image quality of the offset printing master plate obtained and the image quality of the 10,000th print obtained using the master plate were clear.

Furthermore, when the liquid developer was allowed to stand for 3 months and applied for the processing described above, results were completely the same as above.

EXAMPLE 55

In a paint shaker were placed 10 g of poly(decyl methacrylate), 30 g of Isopar H, and 8 g of Alkali Blue together with glass beads and they were dispersed for 2 hours to provide a fine dispersion of Alkali Blue.

Then, by diluting 30 g of the white resin dispersion D-68 obtained in Production Example 68 of latex grains, 4.2 g of the aforesaid Alkali Blue dispersion, and 0.06 g of a semi-docosanylamidated product of a copolymer of diisobutyrene and maleic anhydride with one liter of Isopar G, a liquid developer was prepared.

When the liquid developer was applied to the developing apparatus as in Example 51, no occurrence of stains of the developing apparatus by adhering the toner even after developing 2,000 plates was observed. Also, the image quality of the offset printing master plate obtained and the image quality of the 10,000th print obtained using the master plate were very clear.

EXAMPLES 56 TO 72

By following the same procedure as Example 55 except that each of the latex grains shown in Table 16 below was used in an amount of 6.0 g as solid content was used in place of the white resin dispersion D-68 used in Example 55, each of the following liquid developers was prepared.

TABLE 16

| Example | Latex Grains | Stains of Developing Apparatus | Image of the 2000th Plate |
|---|---|---|---|
| 56 | D-61 | No toner residue adhered | Clear |
| 57 | D-62 | No toner residue adhered | " |
| 58 | D-63 | No toner residue adhered | " |
| 59 | D-64 | No toner residue adhered | " |
| 60 | D-65 | No toner residue adhered | " |
| 61 | D-67 | No toner residue adhered | " |
| 62 | D-69 | No toner residue adhered | " |
| 63 | D-70 | No toner residue adhered | " |
| 64 | D-71 | No toner residue adhered | " |
| 65 | D-72 | No toner residue adhered | " |
| 66 | D-73 | No toner residue adhered | " |
| 67 | D-74 | No toner residue adhered | " |
| 68 | D-75 | No toner residue adhered | " |
| 69 | D-76 | No toner residue adhered | " |
| 70 | D-77 | No toner residue adhered | " |
| 71 | D-78 | No toner residue adhered | " |
| 72 | D-80 | No toner residue adhered | " |

When each of the liquid developers thus obtained was applied to the developing apparatus as in Example 51, no occurrence of stains of the developing apparatus by adhering the toner was observed even after developing 2,000 plates in each case. Also, the image quality of each offset printing master plate obtained and image quality of the 10,000th print obtained using each master plate were very clear.

While the invention has been described in detail and with reference to specific embodiments thereof, it will be apparent to one skilled in the art that various changes and modifications can be made therein without departing from the spirit and scope thereof.

What is claimed is:

1. A liquid developer for electrostatic photography comprising a resin dispersed in a non-aqueous solvent having an electric resistance of at least $10^9 \, \Omega$ cm and a dielectric constant of not higher than 3.5, wherein the dispersed resin is a copolymer resin obtained by polymerizing a solution containing at least one monofunctional monomer (A) which is soluble in the aforesaid non-aqueous solvent but becomes insoluble therein after being polymerized and at least one resin which is a polymer having at least a recurring unit represented by following formula (I), a part of the polymer being crosslinked, a polymerizable carbon to carbon double bond group copolymerizable with said monomer (A) being bonded to only one terminal of at least one polymer main chain thereof, and said resin being soluble in the aforesaid non-aqueous solvent;

wherein $X^1$ represents —COO—, —OCO—, —CH$_2$OCO—, —CH$_2$COO—, —O— or —SO$_2$—; $R^0$ represents a hydrocarbon group having from 6 to 32 carbon atoms; and $a^1$ and $a^2$, which may be the same or different, each represents a hydrogen atom, a halogen atom, a cyano group, a hydrocarbon group having from 1 to 8 carbon atoms, —COO—$Z^1$ or —COO—$Z^1$ bonded via a hydrocarbon group having from 1 to 18 carbon atoms (wherein $Z^1$ represents a hydrogen atom or a hydrocarbon group having from 1 to 18 carbon atoms).

2. The liquid developer for electrostatic photography as in claim 1, wherein the monofunctional monomer (A) is represented by the following formula (IV):

wherein $Y^2$ represents —COO—, —OCO—, —CH$_2$OCO—, —CH$_2$COO—,

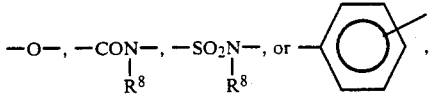

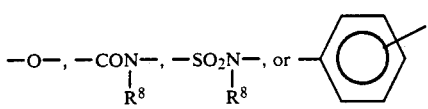

wherein $R^8$ represents a hydrogen atom or an aliphatic group having from 1 to 18 carbon atoms, which may be substituted;

$R^7$ represents a hydrogen atom or an aliphatic group having from 1 to 6 carbon atoms, which may be substituted; and $f^1$ and $f^2$, which may be the same or different, each has the same meaning as $a^1$ and $a^2$ in formula (I).

3. The liquid developer for electrostatic photography as in claim 1, wherein the solution for producing the copolymer resin by the polymerization thereof also contains, together with the monofunctional monomer (A), a monomer (B) having an aliphatic group of at least 8 carbon atoms, being represented by following formula (II), and forming a copolymer with the monomer (A);

wherein $Y^1$ represents

(wherein R⁴ represents an aliphatic group), —OCO—, —CH₂COO—, or —O—; R³ represents an aliphatic group having at least 8 Carbon atoms; and b¹ and b², which may be the same or different, each represents a hydrogen atom, an alkyl group, —COOR⁵ or —CH₂—COOR⁵ (wherein R⁵ represents an aliphatic group).

4. A liquid developer for electrostatic photography as in claim 3, wherein in formula (II) R³ represents an alkyl group having a total carbon atom number of at least 10, which may be substituted, or an alkenyl group having a total carbon atom number of at least 10; Y¹ represent

wherein R⁴ represents an aliphatic group having from 1 to 32 carbon atoms; and b¹ and b², which may be the same or different, each represents a hydrogen atom, a methyl group —COOR⁵ or —CH₂COOR⁵, wherein R⁵ represents an aliphatic group having from 1 to 32 carbon atoms.

5. The liquid developer for electrostatic photography as in claim 1, wherein the solution for producing the copolymer resin by the polymerization thereof also contains, together with the monofunctional monomer (A), a monomer (C) having at least two polar groups and/or polar linkage groups shown by following formula (III);

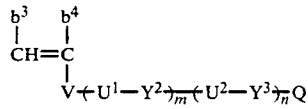

wherein V represents —O—, —COO—, —OCO—, —CH₂OCO—, —SO₂—,

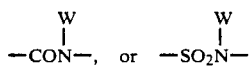

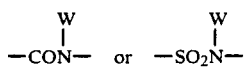

(wherein W represents a hydrocarbon group or has the same meaning as the bond group, ←U¹—Y²⟩ₘ(U²—Y³)ₙQ in formula (III); Q represents a hydrogen atom or a hydrocarbon group having from 1 to 18 carbon atoms, which may be substituted by a halogen atom, —OH, —CN, —NH₂, —COOH, —SO₃H or PO₃H₂; Y² and Y³, which may be the same or different, each represents

—O—, —S—, —CO—, —CO₂—, —OCO—, —SO₂—,

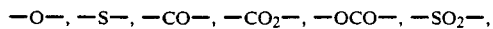

-continued
—NHCO₂—, or —NHCONH—

—O—, —S—, —CO—, —CO₂—, —OCO—, —SO₂—,

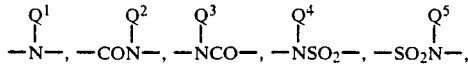

(wherein Q¹, Q², Q³, Q⁴, and Q⁵ have the same significance as Q described above); U¹ and U², which may be the same or different, each represents a hydrocarbon group having from 1 to 18 carbon atoms, which may be substituted or may have

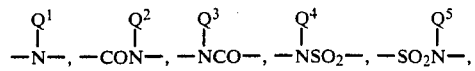

(wherein Y⁴ and Y⁵, which may be the same or different, have the same significance as Y² and Y³ described above; U⁴ represents a hydrocarbon group having from 1 to 18 carbon atoms, which may be substituted, and Q⁶ has the same significance as Q); b³ and b⁴, which may be the same or different, each represents a hydrogen atom, a hydrocarbon group, —COO—L, or —COO—L bonded via a hydrocarbon group (wherein L represents a hydrogen atom or a hydrocarbon group which may be substituted); and m, n, and p, which may be the same or different, each represents an integer of from 0 to 4.

6. A liquid developer for electrostatic photography as in claim 5, wherein in formula (III), V represents

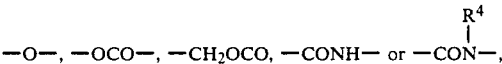

wherein W represents an alkyl group, which may be substituted, having from 1 to 16 total carbon atoms, an alkenyl group, which may be substituted, having from 2 to 16 total carbon atoms, an aliphatic group, which may be substituted, having from 5 to 18 total carbon atoms, or the linkage group ←U¹—Y²⟩ₘ(U²—Y³)ₙQ in formula (III), wherein Q represents a hydrogen atom, a halogen atom or an aliphatic group having from 1 to 16 total carbon atoms, which may be substituted by —OH, —CN or —COOH, Y² and Y³, which may be the same or different, each represents

—O—, —S—, —CO—, —COO—, —OCO—,

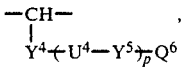

wherein Q² and Q³ each has the same meaning as Q described above, U¹ and U², which may be the same or different, each represents a hydrocarbon group having from 1 to 12 carbon atoms, which may be substituted or may have

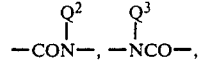

wherein Y⁴ and Y⁵, which may be the same or different, have the same meaning as Y² and Y³ described above, $U^4$ represents an alkylene group having from 1 to 12 carbon atoms, an alkenylene group, or an arylene group, which may be substituted, and $Q^6$ has the same meaning as aforesaid Q in the main chain bond;

- $b^3$ and $b^4$, which may be the same or different, each represents a hydrogen atom, a methyl group, —COO—L or —CH$_2$COO—L, wherein L represents a hydrogen atom, an alkyl group having from 1 to 18 carbon atoms, an alkenyl group, an aralkyl group or a cycloalkyl group; and
- m, n and p, which may be the same or different, each represents 0, 1, 2 or 3.

7. The liquid developer for electrostatic photography as claimed in claim 1, wherein the amount of resin (I) is from 1 to 100 parts by weight per 100 parts by weight of monomer (A).

8. The liquid developer for electrostatic photography as claimed in claim 2, wherein polymer (B) is used in an amount of from 0.1 to 20% by weight based on the weight of monomer (A).

9. The liquid developer for electrostatic photography as claimed in claim 3, wherein monomer (C) is used in amount of from 0.1 to 30% by weight based on the weight of monomer (A).

10. The liquid developer for electrostatic photography as claimed in claim 1, wherein said developer further contains a colorant.

11. The liquid developer for electrostatic photography as claimed in claim 1, wherein said dispersed resin particles are present in an amount of from 0.5 to 50 parts by weight per 1,000 parts by weight of the carrier liquid.

12. The liquid developer for electrostatic photography as claimed in claim 11, wherein said dispersed resin particles further comprise a colorant.

* * * * *